(12) United States Patent
Brixius et al.

(10) Patent No.: US 10,755,299 B2
(45) Date of Patent: Aug. 25, 2020

(54) METHODS AND APPARATUS TO INCORPORATE SATURATION EFFECTS INTO MARKETING MIX MODELS

(71) Applicant: The Nielsen Company (US), LLC, New York, NY (US)

(72) Inventors: Nathan Brixius, Evanston, IL (US); Ross Link, Evanston, IL (US)

(73) Assignee: THE NIELSEN COMPANY (US), LLC, New York, NY (US)

(*) Notice: Subject to any disclaimer, the term of this patent is extended or adjusted under 35 U.S.C. 154(b) by 253 days.

(21) Appl. No.: 15/659,313

(22) Filed: Jul. 25, 2017

(65) Prior Publication Data
US 2017/0323332 A1  Nov. 9, 2017

Related U.S. Application Data

(62) Division of application No. 13/835,695, filed on Mar. 15, 2013, now Pat. No. 9,721,271.

(51) Int. Cl.
G06Q 30/00 (2012.01)
G06Q 30/02 (2012.01)

(52) U.S. Cl.
CPC ..... *G06Q 30/0244* (2013.01); *G06Q 30/0242* (2013.01); *G06Q 30/0246* (2013.01)

(58) Field of Classification Search
CPC .................. G06Q 30/0242; G06Q 30/0244
USPC ........................................................ 705/14
See application file for complete search history.

(56) References Cited

U.S. PATENT DOCUMENTS

| | | | |
|---|---|---|---|
| 2,881,244 | A | 4/1959 | Pawley et al. |
| 3,845,391 | A | 10/1974 | Crosby |
| 4,025,851 | A | 5/1977 | Haselwood et al. |
| 4,079,419 | A | 3/1978 | Siegle et al. |
| 4,230,990 | A | 10/1980 | Lert, Jr. et al. |

(Continued)

FOREIGN PATENT DOCUMENTS

WO  0115021  3/2001

OTHER PUBLICATIONS

Kang, Moon Young, Advertising Decisions: Which Product, Where and When?, 2010, ProQuest Dissertations Publishing (Year: 2010).*

(Continued)

*Primary Examiner* — Matthew L Hamilton
(74) *Attorney, Agent, or Firm* — Hanley, Flight & Zimmerman, LLC

(57) ABSTRACT

Methods and apparatus to incorporate saturation effects into marketing mix models are disclosed. An example apparatus includes a reach calculator to convert adstock data associated with an advertising campaign into effective reached realized (ERR) data based on a relationship between reach and adstocked gross rating points indicative of saturation effects of the advertising campaign on a target audience of the advertising campaign. The adstock data corresponds to adstocked gross rating points generated from marketing mix input data. The marketing mix input data includes (a) sales data associated with sales over a period of interest and (b) advertising data associated with the advertising campaign during the period of interest. The apparatus also includes a regression engine to determine an impact of the advertising campaign on the sales during the period of interest based on the ERR data analyzed relative to the sales data.

20 Claims, 11 Drawing Sheets

(56) References Cited

U.S. PATENT DOCUMENTS

| | | | |
|---|---|---|---|
| 4,313,197 A | 1/1982 | Maxemchuk | |
| 4,425,661 A | 1/1984 | Moses et al. | |
| 4,547,804 A | 10/1985 | Greenberg | |
| 4,677,466 A | 6/1987 | Lert, Jr. et al. | |
| 4,805,020 A | 2/1989 | Greenberg | |
| 4,945,412 A | 7/1990 | Kramer | |
| 4,967,273 A | 10/1990 | Greenberg | |
| 4,982,346 A | 1/1991 | Girouard et al. | |
| 5,216,515 A | 6/1993 | Steele et al. | |
| 5,227,874 A | 7/1993 | Von Kohorn | |
| 5,331,544 A | 7/1994 | Lu et al. | |
| 5,450,490 A | 9/1995 | Jensen et al. | |
| 5,490,060 A | 2/1996 | Malec et al. | |
| 5,579,124 A | 11/1996 | Aijala et al. | |
| 5,652,615 A | 7/1997 | Bryant et al. | |
| 5,719,937 A | 2/1998 | Warren et al. | |
| 5,740,549 A | 4/1998 | Reilly et al. | |
| 5,765,141 A | 6/1998 | Spector | |
| 5,774,170 A | 6/1998 | Hite et al. | |
| 5,774,452 A | 6/1998 | Wolosewicz | |
| 5,787,334 A | 7/1998 | Fardeau et al. | |
| 5,822,360 A | 10/1998 | Lee et al. | |
| 5,826,165 A | 10/1998 | Echeita et al. | |
| 5,848,397 A | 12/1998 | Marsh et al. | |
| 5,893,075 A | 4/1999 | Plainfield et al. | |
| 5,933,811 A | 8/1999 | Angles et al. | |
| 5,937,392 A | 8/1999 | Alberts | |
| 5,966,696 A | 10/1999 | Giraud | |
| 5,970,469 A | 10/1999 | Scroggie et al. | |
| 5,974,396 A | 10/1999 | Anderson et al. | |
| 5,974,398 A | 10/1999 | Hanson et al. | |
| 5,992,888 A | 11/1999 | North et al. | |
| 5,999,912 A | 12/1999 | Wodarz et al. | |
| 6,026,369 A | 2/2000 | Capek | |
| 6,075,551 A | 6/2000 | Berezowski et al. | |
| 6,286,005 B1 | 9/2001 | Cannon | |
| 6,295,092 B1 | 9/2001 | Hullinger et al. | |
| 6,338,043 B1 | 1/2002 | Miller | |
| 6,353,929 B1 | 3/2002 | Houston | |
| 6,567,786 B1 | 5/2003 | Bibelnieks et al. | |
| 6,772,129 B2 | 8/2004 | Alvarez et al. | |
| 6,799,326 B2 | 9/2004 | Boylan, III et al. | |
| 7,039,931 B2 | 5/2006 | Whymark | |
| 7,222,099 B2 | 5/2007 | Forsythe et al. | |
| 7,873,535 B2 | 1/2011 | Umblijs et al. | |
| 7,904,327 B2 | 3/2011 | Phelan et al. | |
| 8,065,198 B2 | 11/2011 | Fuxman et al. | |
| 8,209,216 B2 | 6/2012 | Whipkey et al. | |
| 8,255,246 B2 | 8/2012 | Beyer et al. | |
| 8,260,685 B2 | 9/2012 | Fuxman et al. | |
| 2002/0059578 A1 | 5/2002 | Nishiura | |
| 2002/0178445 A1 | 11/2002 | Eldering et al. | |
| 2003/0070167 A1 | 4/2003 | Holtz et al. | |
| 2003/0101454 A1 | 5/2003 | Ozer et al. | |
| 2004/0024633 A1 | 2/2004 | Whymark | |
| 2004/0025177 A1 | 2/2004 | Whymark | |
| 2004/0216157 A1 | 10/2004 | Shain et al. | |
| 2004/0225562 A1 | 11/2004 | Turner | |
| 2004/0230477 A1* | 11/2004 | Alvarez | G06Q 30/02 705/14.41 |
| 2005/0015796 A1 | 1/2005 | Bruckner et al. | |
| 2005/0193411 A1 | 9/2005 | Funston | |
| 2005/0283795 A1 | 12/2005 | Steelberg et al. | |
| 2005/0289583 A1 | 12/2005 | Chiu | |
| 2006/0031111 A9 | 2/2006 | Whymark | |
| 2007/0016918 A1 | 1/2007 | Alcorn et al. | |
| 2007/0039018 A1 | 2/2007 | Saslow et al. | |
| 2007/0294126 A1 | 12/2007 | Maggio | |
| 2009/0094631 A1 | 4/2009 | Whymark et al. | |
| 2009/0187932 A1 | 7/2009 | Rathbum et al. | |
| 2010/0114637 A1 | 5/2010 | Folkert et al. | |
| 2010/0114657 A1 | 5/2010 | Whipkey et al. | |
| 2010/0114794 A1 | 5/2010 | Lakshminarayan et al. | |
| 2011/0010226 A1 | 1/2011 | Guild | |
| 2011/0017286 A1 | 1/2011 | Alivisatos et al. | |
| 2011/0054860 A1* | 3/2011 | Guild | G06Q 10/04 703/2 |
| 2011/0313814 A1 | 12/2011 | Briggs | |
| 2011/0314495 A1 | 12/2011 | Zenor | |
| 2012/0323675 A1* | 12/2012 | Paparo | G06Q 30/0243 705/14.42 |
| 2013/0030886 A1 | 1/2013 | Poortinga et al. | |
| 2013/0124302 A1 | 5/2013 | Briggs | |
| 2014/0278930 A1 | 9/2014 | Brixius et al. | |

OTHER PUBLICATIONS

United States Patent and Trademark Office, "Notice of Allowance and Fee(s) Due," issued in connection with U.S. Appl. No. 13/835,695, dated Mar. 24, 2017, 36 pages.

United States Patent and Trademark Office, "Non-Final Rejection," issued in connection with U.S. Appl. No. 13/835,695, dated May 18, 2015, 26 pages.

United States Patent and Trademark Office, "Final Rejection," issued in connection with U.S. Appl. No. 13/835,695, dated Nov. 5, 2015, 39 pages.

United States Patent and Trademark Office, "Requirement for Restriction and/or Election," issued in connection with U.S. Appl. No. 13/835,695, dated Mar. 4, 2015, 6 pages.

United States Patent and Trademark Office, "Non-Final Rejection," issued in connection with U.S. Appl. No. 13/835,695, dated Oct. 5, 2016, 16 pages.

Fletcher, John C., "Teleproof2: The Technology," Journal of the SMPTE published by the Society of Motion Picture and Television Engineers, vol. 84, Mar. 1975, 3 pages.

Mahajan et al., "New Product Diffusion Models in Marketing: A Review and Directions for Research" The Journal of Marketing, vol. 54, No. 1, Jan. 1990, 27 pages.

* cited by examiner

VOLUME — 500

| | | Penetration (%) | |
|---|---|---|---|
| | | 20 | 95 |
| EF | 1 | 0.20 | 0.95 |
| | 4 | 0.20 | 0.95 |

FIG. 5

SCALE — 600

| | | Penetration (%) | |
|---|---|---|---|
| | | 20 | 95 |
| EF | 1 | 22.50 | 97.38 |
| | 4 | 90.42 | 423.68 |

FIG. 6

SHAPE — 700

| | | Penetration (%) | |
|---|---|---|---|
| | | 20 | 95 |
| EF | 1 | 0.99 | 1.00 |
| | 4 | 2.03 | 2.12 |

FIG. 7

METHODS AND APPARATUS TO INCORPORATE SATURATION EFFECTS INTO MARKETING MIX MODELS

RELATED APPLICATIONS

This patent arises from a divisional of U.S. patent application Ser. No. 13/835,695, filed on Mar. 15, 2013, which is hereby incorporated herein by reference in its entirety.

FIELD OF THE DISCLOSURE

This disclosure relates generally to marketing mix models and, more particularly, to methods and apparatus to incorporate saturation effects into marketing mix models.

BACKGROUND

Marketing mix modeling is an analytical tool used in market research that is based on the statistical analysis, such as multivariate regression, of historical sales and marketing data to estimate the impact or contribution of various advertising campaigns via different media on the sales of corresponding advertised products or services.

BRIEF DESCRIPTION OF THE DRAWINGS

FIGS. 5-7 illustrate example tables for Volume, Scale, and Shape parameters that define saturation equations corresponding to the example saturation curves of FIGS. 3 and 4

DETAILED DESCRIPTION

Figure 1:
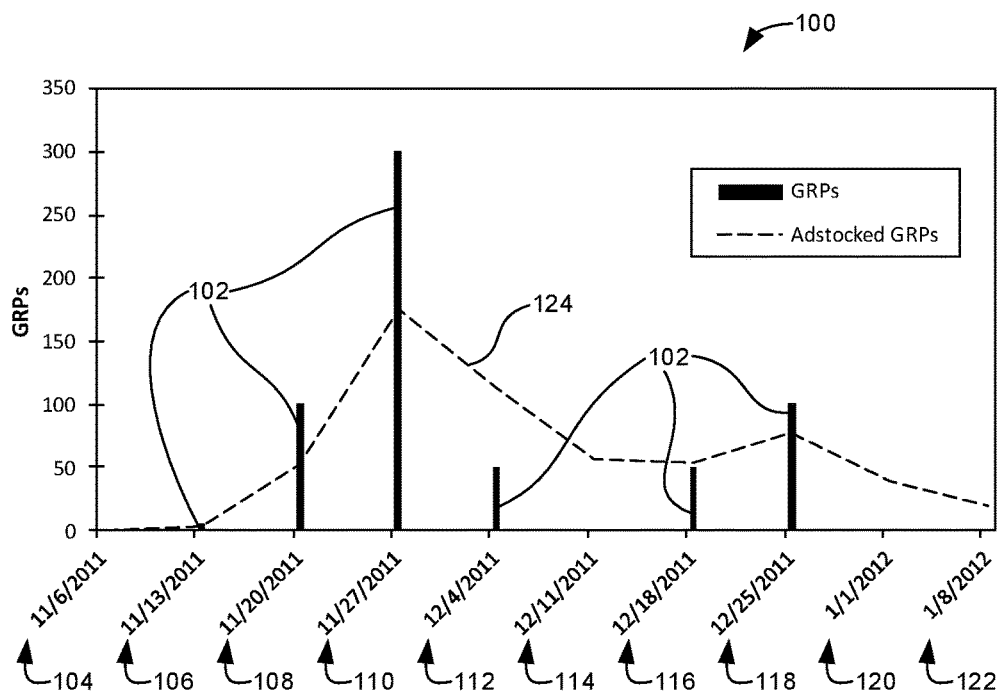
FIG. 1 illustrates a graph represented raw GRPs and corresponding Adstocked GRPs delivered over a ten week period for an example advertising campaign.

Market analysts may be chartered with one or more tasks related to understanding how different factors impact sales over time. The market analysts may exert such efforts in response to client requests, in which clients may include manufacturers, retailers, merchants and/or wholesalers that wish to appreciate and/or otherwise understand factors that help and/or hurt sales. Factors capable of affecting sales include, but are not limited to promotional activity (e.g., television promotions, radio promotions, newsprint promotions, online promotions, etc.), macro-economic factors and seasonality.

To better understand what relationships exist between one or more factors, a statistical regression analysis may be performed using independent and dependent variables related to the client sales environment. Independent variables may include a variety of factors, some of which are under the control of the client such as, for example, advertising campaign media types (e.g., television, radio, etc.), campaign target demographics, campaign dates and/or time-of-day, geographic locations of the advertising campaigns, etc. The regression analysis provides market analysts with one or more coefficients indicative of a manner in which independent variable affect dependent variables. In other words, the one or more coefficient weights indicate a measure of contribution or impact of a particular advertising campaign or other promotional activities on sales (e.g., an amount of lift in sales due to the particular marketing endeavor). Based on the determined contribution of each advertising campaign on sales included in a marketing mix model estimation, future sales may be predicted and/or the arrangement of a mixed marketing campaign may be enhanced (e.g., optimized) within constraints defined by an allotted marketing budget.

In many known marketing mix systems, inputs for promotional activities and/or advertising campaigns are based on gross rating points (GRPs), which are a measure of an amount of advertising effort over a specified period. More particularly, GRPs is a term of art, which as used herein, refers to a measure of an amount of advertising exposures produced by a specific advertising campaign during a specific period of time (or the sum of all exposures from multiple campaigns during a period of time). GRPs are calculated by multiplying the percentage of a target audience reached by (e.g., exposed to) an advertisement of the campaign with the frequency of exposure (e.g., the number of times the audience is exposed to the advertisement) during a set period of time (e.g., in a one week period). For example, if a television advertisement is aired once during a week and reaches 75% of a target audience, the resulting GRP value would be 75 (75%×1). Similarly, if the television advertisement is aired three times with a reach of 75% each time, the resulting GRP value would be 225 (75%×3). The amount of GRPs delivered for an advertising campaign can be correlated with the level of spending on advertisements. That is, an increase in expenditures on a campaign corresponds to an increase in GRPs because increased spending typically implies having more instances of an advertisement and/or reaching out to more of the target audience.

Generating or estimating a marketing mix model is based on historical sales and marketing data (e.g., GRPs for each advertising campaign to be analyzed) over an extended period of interest (e.g., 2 months, 12 months, 2 years, etc.). In many known model estimation systems the GRPs purchased or delivered during the period of interest for each campaign are broken down by a consistent incremental time period (e.g., each week during the campaign). Using such data, time-phased GRPs can be visually represented via a graph as shown in FIG. 1. In particular, FIG. 1 illustrates an example graph 100 with bars 102 representing GRPs (Y-axis) purchased over a ten week period of time (X-axis) (each of the weeks during the diagramed period of interest is identified by corresponding reference numerals 104, 106, 108, 110, 112, 114, 116, 118, 120, 122).

In many advertising campaigns, GRPs delivered over an extended period of interest will have weeks where the GRP value is 0 because no advertising for the particular campaign occurred during the corresponding weeks. For example, the GRPs associated with a limited run advertising campaign will be zero during the period of interest before and after the campaign. In other examples, GRPs will be zero between periods of activity in a campaign scheduled on an episodic, periodic, or seasonal basis. Thus, as shown by the GRPs associated with the example advertising campaign diagramed in the graph 100 of FIG. 1, the first, sixth, ninth, and tenth weeks 104, 114, 120, 122 have a GRP value of 0 whereas the remaining weeks, 106, 108, 110, 112, 116, 118 indicate that GRPs were purchased in amounts ranging from 20 GRPs (during the second week 106) to 300 GRPs (during the fourth week 110).

Using the GRPs delivered during each segmented time period for each campaign to be analyzed in connection with sales data for the entire period of interest, a regression model can be built to estimate the contribution or impact of each campaign on the sales. However, it is known that time-phased GRPs (e.g., GRPs grouped by week during the period of interest) are a poor predictor of sales over time because people do not always respond to an advertisement immediately after being exposed to the advertisement. To use the graph 100 as an example, with the large advertising push that occurred during the fourth week 110 (e.g., 300 GRPs delivered), it is probable that many people were exposed to the advertisement at least once that week. However, some of the people exposed during the fourth week 110 may not follow through with a purchase of the advertised product or service until the sixth week 114 diagramed in the graph 100. As such, when determining the contribution of the diagramed advertising campaign on sales relative to other factors in a regression analysis, the sale made during the sixth week 114 (when no GRPs were purchased) would incorrectly be attributed to something other than the advertising campaign of graph 100 because the sale was based on an advertisement from the fourth week 110 (when 300 GRPs were delivered). In other words, there was a two week lag of time from when some people were exposed to the advertisement (during the fourth week 110) and when they made the purchase (during the sixth week 114).

While there may be a time lag between an advertisement and a response (e.g., a sale) by members of a target audience exposed to the advertisement, the lag time cannot be accounted for by a mere shift in time. On the contrary, most responses (e.g., sales) due to an advertisement occur relatively soon after the occurrence of the advertisement with the advertisement eliciting fewer and fewer responses as time moves on. In other words, the actual effect of GRPs delivered at a certain point in time may be realized over a span of time, but the effect decreases as the span of time increases. Many marketing mix systems account for the decay of the effect realized of GRPs over time through adstocking. Adstocking is a marketing research technique that takes raw GRPs purchased during one period of time and distributes them over a range of future periods. The effective GRPs realized at any point in time, based on the temporal distribution of the effect of the raw GRPs, is herein referred to as Adstocked GRPs. Adstocked GRPs are based on an assumption that the effect realized from GRPs delivered at a certain point in time decays exponentially over time. Thus, based on a decay factor (D), the Adstocked GRPs (A) for a time period (t) as a function of raw GRPs $(x_t)$ can be calculated as follows:

$$A(x_t)=Dx_t+(1-D)A(x_{t-1}) \quad \text{Equation 1.}$$

Accordingly, using a decay factor of D=0.5 to transform the raw GRPs (represented by the bars 102) plotted in the graph 100 of FIG. 1, the resulting Adstocked GRPs are represented by the dotted line 124. Thus, while 300 GRPs are delivered during the fourth week 110, the effective GRPS realized that week is only 170 GRPs (some amount of which correspond to the lag time effect of the GRPs delivered during the second and third weeks 106, 108 of the period being analyzed). The remaining portion of the 300 GRPs purchased during the fourth week 110 is realized in incrementally decreasing amounts (due to adstocking decay) over the subsequent weeks 112, 114, 116, 118, 120, 122 as combined with subsequent GRPs purchased.

As with the raw GRPs represented by the bars 102, the Adstocked GRPs correspond to discrete data points associated with the effective GRPs realized during each corresponding week 104, 106, 108, 110, 112, 114, 116, 118 120, 122. However, to highlight the smoothing effect of the transformation of the raw GRPs to Adstocked GRPs, the data points in the graph 100 of FIG. 1 are shown connected by the line 124. Having calculated the Adstocked GRPs for each advertising campaign to be analyzed for model estimation, many marketing mix systems then perform a linear regression to generate a marketing mix model that estimates the contribution of each of the advertising campaigns on sales over the period of interest being modeled. Once the contributions of each advertising campaign are determined (as well as any other factors considered in the regression), the results of the model can be evaluated to estimate future sales based on scheduled advertising campaigns going forward. Furthermore, the results of marketing mix models can be evaluated to make business decisions such as determining marketing expenditures across media types and/or geographic areas to enhance (e.g., optimize) a return on investment within budgetary constraints and/or other considerations.

While analyzing Adstocked GRPs provides a better model of the impact of marketing on sales than analyzing raw GRPs, marketing mix models generated based on Adstocked GRPs are subject to several limitations. For instance, it is well known that there are diminishing returns associated with increased marketing expenditures (e.g., increased GRPs purchased) due to the target audience becoming saturated. That is, the relationship between the amount of GRPs purchased and the corresponding achieved is not linear. Rather, as a target audience is exposed more and more to an advertising message (e.g., increasing GRPs), the increase in reach is smaller and smaller because fewer and fewer target audience members will have yet to be exposed to the advertising message. Further, a diminishing impact on reach implies a diminishing effect on sales because once the target audience has been reached, they will either respond with a purchase or choose not to respond. Any additional advertising will have little impact and merely serves to saturate the target audience more. A target audience is said to be saturated when the number of GRPs in a given period exceeds a threshold value at which point further marketing expenditures are greater than any anticipated benefit to be drawn therefrom.

Figure 2:
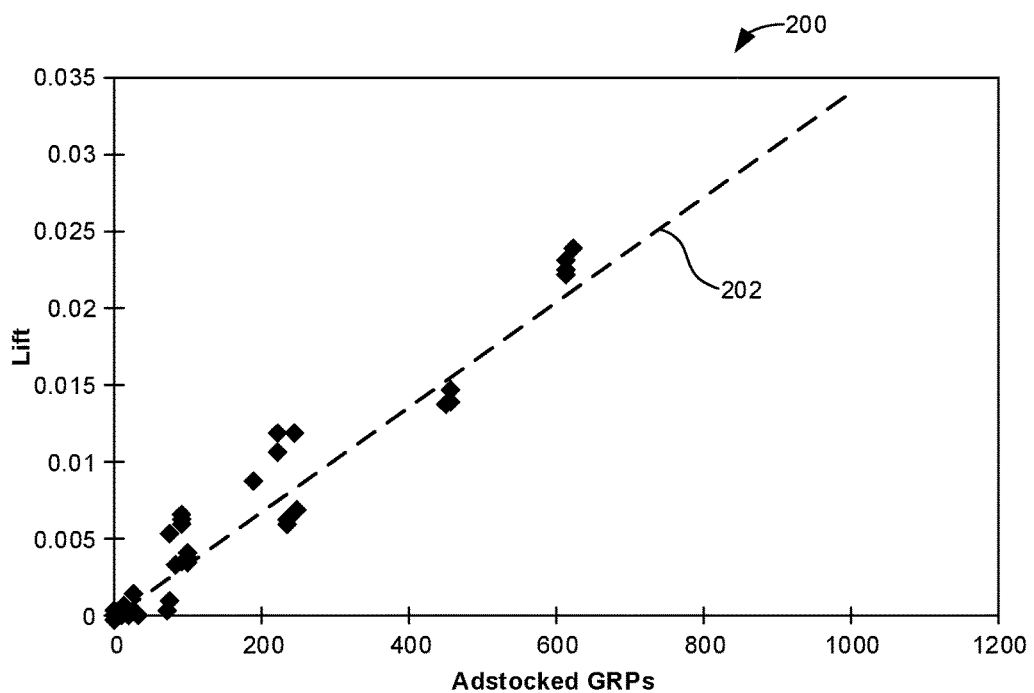
FIG. 2 illustrates a graph with a response curve fit to data points output from a known marketing mix model.

While the diminishing returns effects of marketing expenditures are well known, known marketing mix systems do not account for such effects in generating marketing mix models. One reason for not incorporating saturation effects in current marketing mix models estimation is that the nature of saturation cannot be determined based on the marketing mix model input data used to generate the model. As a result, marketing mix models implemented today only output a linear relationship between GRPs and resulting lift in sales which cannot be reliably used to forecast future sales or plan future marketing endeavors. For example, FIG. 2 illustrates a graph 200 with a response curve 202 generated from a known marketing mix model. As shown in the graph 200, the response curve 202, based upon a best fit curve of the calculated lift in sales contributed by the corresponding advertising campaign, is a straight line. Accordingly, the response curve 202 cannot be used to forecast future sales or project the impact of increasing GRPs with any reliability. Some analysts attempt to adjust marketing mix systems results, such as the response curve 202 of FIG. 2, to account for saturation after model estimation is completed. However, this process is prone to error and is not especially accurate because it is based on the assumptions of analysts playing with the numbers to arrive at what the analysts think is curve that reasonable accounts for saturation without having any grounding in hard data associated with the particular advertising campaign being analyzed. Furthermore, the process of adjusting a marketing mix model after the fact requires analysts to correct the response curve for each campaign being analyzed in each model to be evaluated. As such, the process can be time consuming and requires human-based expertise rather than generating response curves that can be reliably used in forecasting sales and/or planning future marketing campaigns.

The teachings disclosed herein overcome these obstacles by incorporating the effects of saturation directly into marketing mix model estimation to produce more accurate results with more realistic response curves for better forecasting of sales and/or planning of future marketing endeavors. As disclosed herein, the inclusion of saturation into model estimation is based on estimating an initial saturation curve based on an initial estimate of a penetration and an effective frequency associated with each of the advertising campaigns to be analyzed. In such examples, the initial estimate for penetration and effective frequency are used to define ranges of plausible penetrations and ranges of plausible effective frequencies to define corresponding ranges of plausible saturation curves that may be analyzed against the marketing mix model input data to determine the curve that best fits the data. The initial estimate for the penetration and effective frequency for each advertising campaign can be based on a variety of known attributes and/or characteristics associated with the corresponding campaigns. For example, estimates of penetration and effective frequency in some examples are based on the media type of the campaign, demographic information associated with the target audience of the campaign, the geographic region of the advertising campaign, the type of product (or service) associated with advertising campaign, the comparable penetration and/or effective frequency of comparable campaigns associated with related and/or competing products, the complexity of the advertising copy (e.g., the advertising message) associated with the campaign, and/or the results of previous marketing mix studies. Additionally or alternatively, in some examples, best fitting saturation curves determined for particular advertising campaigns (e.g., based on any of the attributes described above) can be saved in a database for use as an initial estimate in determining a best fitting saturation curve for similar advertising campaigns in a later developed marketing mix model. In this manner, an iterative feedback loop can be developed that uses the calculated best fitting curves from previous model estimations into calculated best fitting curves for subsequent model estimation thereby refining the estimation process over time. Furthermore, the methods and apparatus disclosed herein enable the calculation (or retrieval) of saturation curves for incorporating saturation effects into model estimation in an automated way to reduce or eliminate the tuning of response curves generated from models by market analysts after the fact.

In some examples, a saturation equation that defines a best fitting saturation curve associated with each particular advertising campaign being analyzed is used to convert the effective GRPs realized (i.e., Adstocked GRPs) at each segment of time during the period of interest into a corresponding measure of Effective Reach Realized (ERR) for each segment of time. The ERR for a particular advertising campaign is used herein to refer to the percentage of target audience members effectively exposed to an advertisement a sufficient number of times to elicit a response (e.g., a sale). ERR is distinguished from effective reach, which is a term of art, in that effective reach is a measure of the percentage of target audience members actually exposed to an advertisement during a specified period. In contrast, as used herein, ERR is described in terms of "effective" exposure during a time period, which takes into account the time lag or decaying effect of advertisements over time. Thus, an individual exposed to an advertisement one week may count towards the ERR of the corresponding advertisement in a subsequent week because of the temporal distribution of GRPs built into the Adstocked GRPs from which ERR is calculated.

Once the ERR for each campaign is calculated during each segmented point of time the period of interest being analyzed, the resulting data may be run through a regression analysis as is done in known marketing mix systems. That is, each advertising campaign (and all other factors under consideration) is analyzed against sales data for the period of interest to determine the lift in sales due to each advertising campaign to thereby generate a marketing mix model for subsequent evaluation to predict and/or plan the effectiveness of future marketing efforts. By accounting for saturation via the ERR during model estimation, response curves output by the model will be more reliable than the response curves generated from known marketing mix models. Another advantage of accounting for saturation within the model estimation process via the ERR, is that ERR is more closely related to purchase decisions than Adstocked GRPs. As a result, the marketing mix model generated with the ERR data is much more accurate and reliable.

Figure 3:
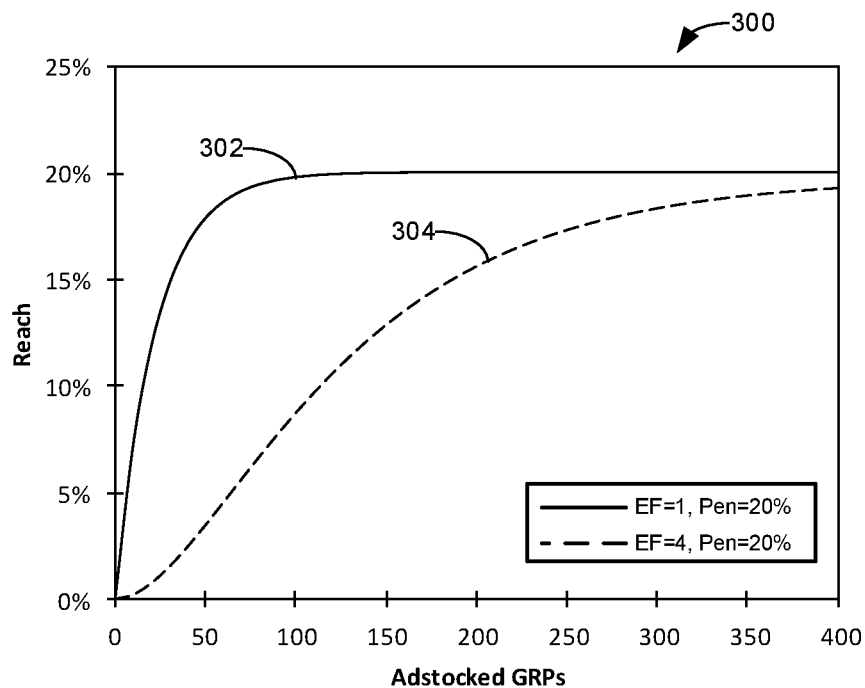
FIGS. 3 and 4 illustrate graphs containing example saturation curves.
Figure 4:
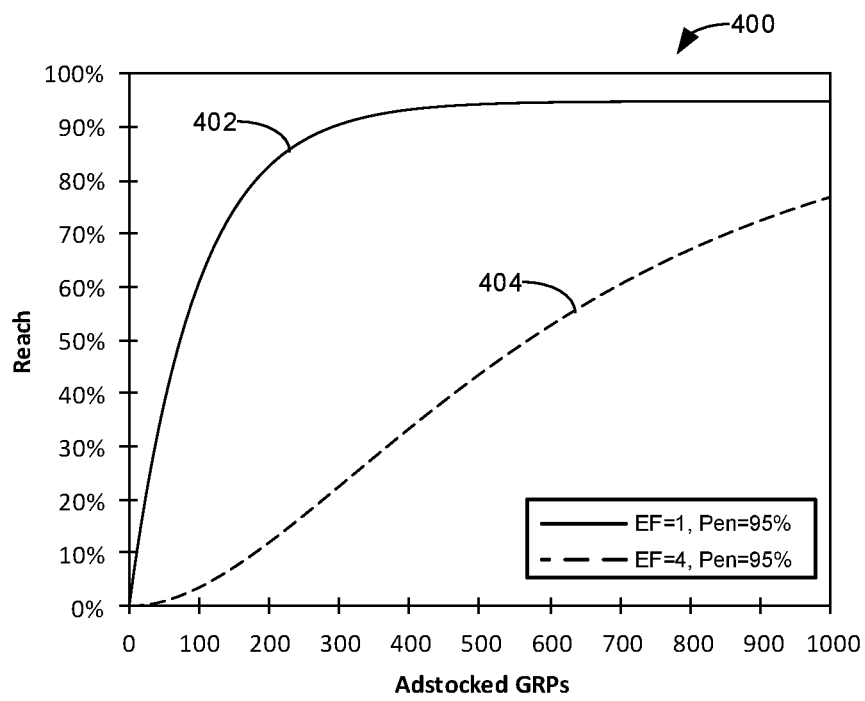
Figure 8:
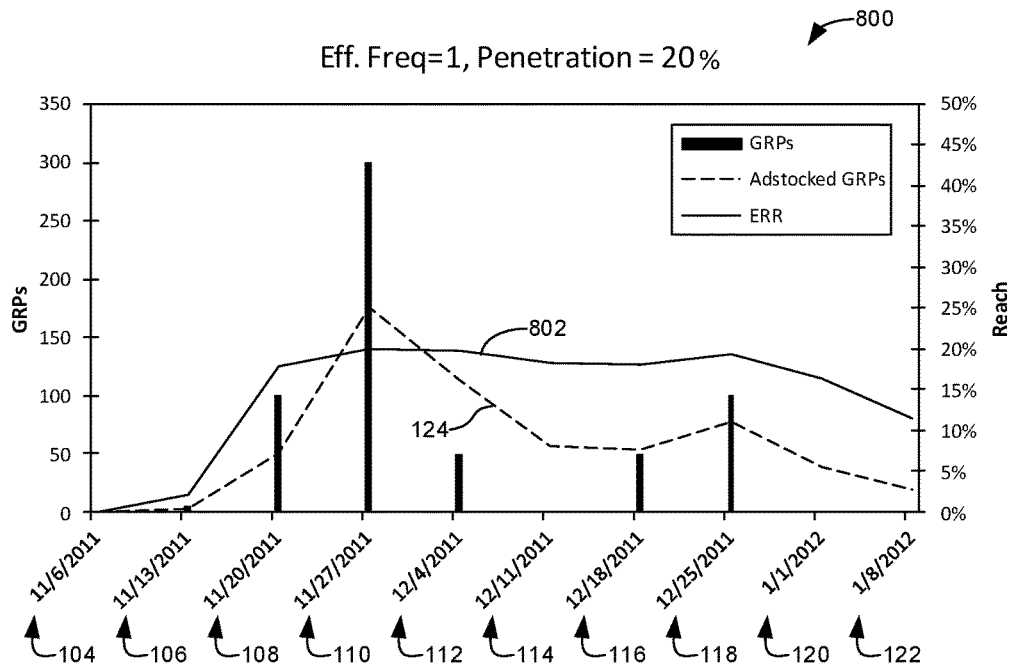
FIGS. 8-11 illustrate graphs that represent the Effective Reach Realized from the Adstocked GRPs of FIG. 1 based on the saturation curves of FIGS. 3 and 4.
Figure 9:
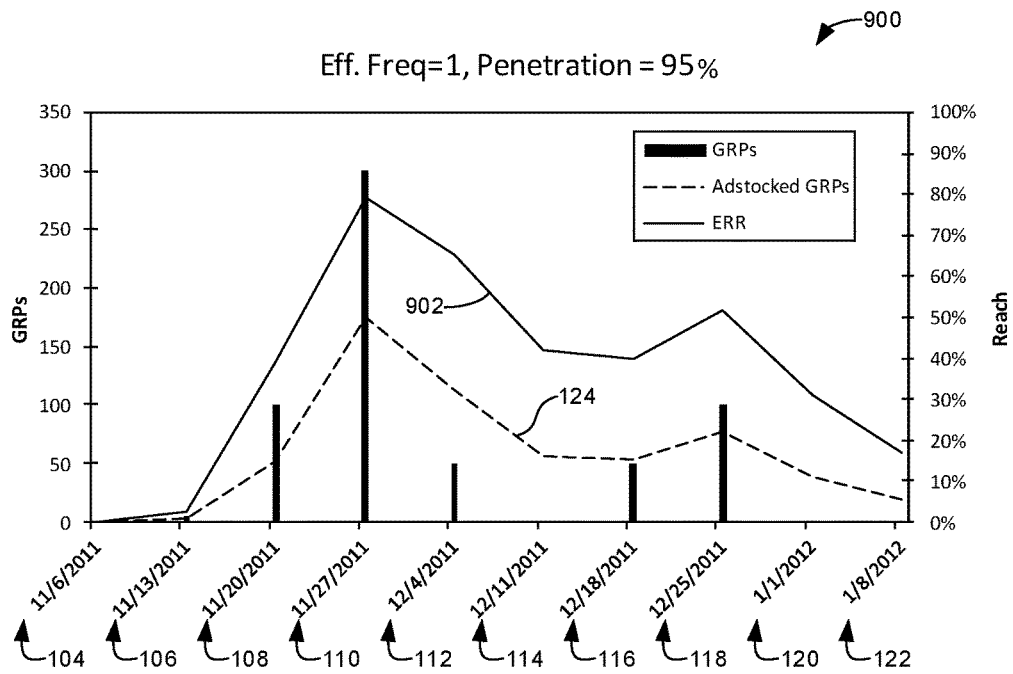

The ERR for an advertising campaign is most accurate if the saturation equation from which the ERR was calculated corresponds to the real-world diminishing effects of the advertising campaign as GRPs increase. In some examples, the saturation equation is assumed to match a reach curve (or saturation curve) associated with the advertising campaign. A saturation curve is a curve that results from plotting the total reach of an advertising campaign during a specified period against a total amount of Adstocked GRPs delivered during the period. FIGS. 3 and 4 illustrate graphs 300, 400 containing example saturation curves 302, 304, 402, 404. In some examples, the saturation equation (e.g., defining a saturation curve) for a given advertising campaign is assumed to depend on three factors: (1) the amount of advertising effort (as measured in GRPs), (2) the effective frequency of the campaign, (3) and the penetration of the campaign. The effective frequency of an advertising campaign is defined as the average number of times a person must be exposed to an advertising message before a response is made (e.g., a decision to purchase the advertised product or service). The effective frequency depends upon the complexity of an advertising message. For example, a person exposed to a straight forward promotional advertisement (e.g., a coupon that offers a discount on a directly identified product) probably only needs to see the coupon once to decide whether or not to respond to the advertisement by purchasing the product. In contrast, a more complicated advertising message (e.g., a television advertisement spot that only identifies a product or brand at the very end of the spot) may require multiple exposures (e.g., 2, 3, 5, etc.) by an individual to sufficiently grasp the concept of the advertisement and formulate an opinion about whether to respond to the advertisement (e.g., make a purchase). As the actual number of exposures required for a particular individual to respond to an advertisement may vary from person to person, the effective frequency of an advertising campaign is expressed as an average. Further, effective frequency can be expressed in fractions in addition to whole numbers because of the variance in how many exposures are sufficient to elicit a response.

The penetration of an advertising campaign corresponds to the maximum number of individuals (or households) of a target population that can possibly be reached via a particular medium. Expressed differently, in one example, penetration is defined as the percentage of individuals (or households) that are physically able to be exposed to a medium. For example, approximately 98% of U.S. households own a television. Therefore, the penetration of a television advertisement could reach 98%. However, the penetration for a particular advertising campaign may vary if it is limited to cable television (subscribed to by a somewhat smaller percentage of households) or focused on a particular demographic (e.g., television ownership may be lower for males aged 18-24 than it is for the nation as a whole). In some examples, penetration is derived from the type of media used in the advertising campaign and demographic information associated with and the particular demographics of the target audience of the advertising campaign. In some such examples, the demographic information is collected through audience measurement surveys and/or is obtained from audience measurement entities, such as The Nielsen Company, that collect such data. Additionally or alternatively, in some examples, other factors and/or attributes associated with the advertising campaign are considered in determining the penetration corresponding to the campaign.

A saturation or reach curve (corresponding to a saturation equation used in some examples disclosed herein) can be shown graphically by plotting GRPs (e.g., Adstocked GRPs) against reach for a fixed effective frequency and fixed penetration. For example, as illustrated in the graph 300 of FIG. 3, the saturation curves 302, 304 are associated with the same penetration but different effective frequencies. In particular, the curve 302 corresponds to an effective frequency of 1 and a penetration of 20%, while the curve 304 corresponds to an effective frequency of 4 and a penetration of 20%. For comparison, the graph 400 of FIG. 4, the saturation curves 402, 404 are both associated with a penetration of 95%, with the curve 402 corresponding to an effective frequency of 1 and the curve 404 corresponding to an effective frequency of 4. As illustrated in the graphs 300, 400, as GRPs increase the curves 302, 304, 402, 404 level off, indicating the diminishing returns effect due to saturation. More specifically, the point at which each of the curves 302, 304, 402, 404 levels off corresponds to the penetration associated with the curve. That is, the saturation curves 302, 304 asymptotically approach a reach of 20% as GRPs increase and saturation curves 402, 404 asymptotically approach a reach of 95%. Further, the shape of each curve 302, 304, 402, 404 is based on the effective frequency. In particular, for an effective frequency of 1, the resulting curve (e.g., the curves 302, 402) is a C-shaped curve characterized by a constantly diminishing slope. For effective frequencies greater than 1, the resulting curves (e.g., the curves 304, 404) are S-shaped; characterized by a slope that initially increases with increasing GRPs and then decreases thereafter. For the S-shaped saturation curves, a higher effective frequency corresponds to a longer leading tail on the resulting curve.

In some examples, to calculate a saturation equation to be used to transform Adstocked GRPs to ERR, a reach curve (e.g., saturation curve) is generated by plotting data points of known GRPs against known reach, and determining a line that best fits the plotted data points. In some instances, real-world data of GRPs and corresponding reach may be taken from prior marketing research studies and/or previously generated marketing mix models that have been shown to fit real-world data. In other instances, where such data is unavailable, the GRPs and corresponding reach may be derived from simulations of advertising campaigns. For example, a simulated population size of a target audience may be defined (e.g., 10,000 individuals) and a subset of the population is selected based on the known penetration for the campaign (e.g., 8,000 individuals based on 80% penetration). As described above, the penetration in some such examples is inferred from one or more characteristics associated with the campaign to be simulated (corresponding to the actual advertising campaign to be analyzed). Such characteristics include the media type of the campaign, demographic information associated with the target audience of the campaign, and the geographic region of the advertising campaign. From the selected subset, a single advertisement is simulated with a defined GRP value. For example, assume the advertisement is associated with 10 GRPs. As this is a single advertisement there will be no duplicate exposures such that the reach would be 10% of the target population (e.g., 1,000 individuals). Accordingly, 1,000 individuals (10% of the total 10,000 target population) of the 8,000 subset of the target population are randomly selected as being exposed to the advertisement. The process is then repeated with a second simulated advertisement, except that during the second simulated advertisement, at least some of the 1,000 individuals exposed to the first simulated advertisement will likely be randomly selected for exposure to the second advertisement. Accordingly, this duplicate set of individuals does not add to the total reach obtained by the combined first and second advertisements (corresponding to the combined GRPs associated with both advertisements). The simulation continues with the total GRPs simulated with each successive advertisement plotted against the total reach obtained by all the advertisements until the total reach approaches the penetration level. Additionally, this same simulation process is followed to plot the total reach of individuals exposed to at least two of the simulated advertisement and/or any other number to generate a plot defining a curve associated with a corresponding effective frequency.

With simulated data points plotted for a reach curve, a saturation equation can then be defined that corresponds to a line that fits the simulated data. Reach curves (e.g., saturation curves), such as the curves 302, 304, 402, 404 shown in FIGS. 3 and 4, closely match Weibull functions with parameters for Volume, Scale, and Shape. Thus, in some examples, once a simulation has been completed as described above, a saturation equation that defines the ERR (S) for a time period (t) as a function of Adstocked GRPs ($x_t$), can be expressed as follows:

$$S(x_t) = \text{Volume}(1 - e^{\wedge}(-(x_t/\text{Scale})^{\wedge}\text{Shape}))$$ Equation 2.

In Equation 2, the Volume, Scale, and Shape parameters are adjusted appropriately to define a curve that best fits the simulated data. FIGS. 5-7 illustrate example tables 500, 600, 700 for Volume (FIG. 5), Scale (FIG. 6), and Shape (FIG. 7) that define a curve that best fits simulated data generated based on the effective frequencies and penetrations corresponding to the saturation curves 302, 304, 402, 404 of FIGS. 3 and 4. That is, the corresponding values provided in the tables 500, 600, 700 entered into equation 2 produce the curves 302, 304, 402, 404 shown in FIGS. 3 and 4. By simulating a campaign corresponding to any anticipated penetration (e.g., 3%, 6%, 9%, . . . , 99%) paired with any anticipated effective frequency (e.g., 1, 1.5, 2, 2.5, . . . , 6) full tables of Volume, Scale, and Shape can be created and stored to quickly look up the parameters to be entered into equation 2 to define any corresponding saturation curve such that the simulation does not need to be repeated each time a saturation curve needs to be calculated. Although the example values in the tables 500, 600, 700 of FIGS. 5-7 correspond to equation 2, in some examples, different equation(s) are used that define a curve that suitably fits simulated data and correspondingly different tables may be generated for quick retrieval of the resulting saturation equations.

Where saturation equations calculated for a given penetration and effective frequency are based on simulated advertising campaigns, the saturation equations may not exactly model the real-world data being analyzed for marketing mix model estimation. Accordingly, in some examples, the identified penetration for a particular advertising campaign (e.g., based on audience measurement data including media type and demographic information and/or other factors associated with the campaign) and the identified effective frequency for the campaign (e.g., based on the nature and complexity of the advertisement and/or other factors associated with the campaign) are only initial estimates of the penetration and effective frequency and the resulting saturation curve is only a first best guess. In some examples, based on the initial estimate for the effective frequency and penetration of an advertising campaign, a range of plausible effective frequencies and a range of plausible penetrations can be determined to calculate (or look up) a range of plausible saturation curves. For example, if a particular advertising campaign is assumed to have an effective frequency of 2 and a penetration of 70%, a range of plausible saturation curves may be defined by plausible effective frequencies ranging from 1-4 and plausible penetrations ranging from 55%-85%. With a saturation equation defined for any combination of the specified ranges of effective frequency and penetration (e.g., based on earlier simulations), it is a relatively straightforward task to determine which resulting curve from the range of plausible saturation curves best models the actual data. To do so, a regression is run on the marketing mix model with respect to the advertising campaign being analyzed for each of the plausible saturation curves to be tested. That is, a default saturation curve is fixed for every other advertising campaign in the marketing mix model (e.g., based on the initial estimate for effective frequency and penetration for each campaign) and only the saturation curve for the advertising campaign being analyzed is varied. Based on such a regression analysis, the saturation curve that produces a model that best fits the actual marketing mix model input data is identified as the best fitting saturation curve. In some examples, by repeating this process for each advertising campaign, a best fit saturation curve can be determined for each advertising campaign. Then, the best fitting saturation curve for each campaign can be used to transform the Adstocked GRPs for each corresponding campaign to ERR. Based on the resulting ERR for each campaign, a full regression can be run to generate a final marketing mix model that incorporates the diminishing returns effect of saturation. In this manner, more accurate predictions of future sales can be made and enhancing (e.g., optimizing) future marketing endeavors can be made with greater confidence and reliability than with currently known marketing mix systems.

FIGS. 8-11 illustrate graphs 800, 900, 1000, 1100 with the same raw GRPs 102 and Adstocked GRPs represented by line 124 in graph 100 of FIG. 1. The graphs 800, 900, 1000, 1100 also include a line 802, 902, 1002, 1102 corresponding to the ERR from the Adstocked GRPs using Equation 2 with different effective frequencies and penetrations. Specifically, the ERR represented by line 802 of the example graph 800 is associated with the saturation curve 302 of FIG. 3 corresponding to an effective frequency of 1 and a penetration of 20%. The ERR represented by line 902 of the example graph 900 is associated with the saturation curve 402 of FIG. 4 corresponding to an effective frequency of 1 and a penetration of 95%. The ERR represented by line 1002 of the example graph 1000 is associated with the saturation curve 304 of FIG. 3 corresponding to an effective frequency of 4 and a penetration of 20%. The ERR represented by line 1102 of the example graph 1100 is associated with the saturation curve 404 of FIG. 4 corresponding to an effective frequency of 4 and a penetration of 95%. The ERR is plotted with reference to the scale on the right-hand axis corresponding to reach as a percentage. For purposes of comparison, the scale of the axes in each of the graphs 800, 1000, 1100 go from 0% to 50% (the scale in the graph 900 goes from 0% to 100% because of the much higher ERR achieved during the diagramed time period).

From FIGS. 8-11 it is apparent how much impact a change in the saturation curve can have on the ERR calculated from the same Adstocked GRPs for an advertising campaign at any particular point during the campaign. For example, although the Adstocked GRPs are identical in each graph 800, 900, 1000, 1100 (being based on the same raw GRPs), the resulting ERR calculated based on different saturation curves are significantly different. For instance, the lines 802, 902 of graphs 800, 900 are both based on an effective frequency of 1 but line 802 corresponds to a penetration of 20% whereas line 902 corresponds to a penetration of 95%. Based on this single difference, the ERR in graph 800 hovers between approximately 18% and 20% (near the saturation point) from the third week 108 to the eighth week 118. In contrast, the ERR in graph 900 reaches a peak of approximately 80% during the fourth week 110, declines by half to an ERR of 40% by the seventh week 116, but bounces back to over 50% in the eighth week 118. Accordingly, higher penetration values for an advertising campaign result in much greater variation in the ERR from week to week depending upon whether additional GRPs are purchased. In other words, a lower penetration results in a consistent ERR being stretched out over time. Similar observations can be made when comparing lines 1002, 1102 of graphs 1000, 1100 where the effective frequency is fixed at 4 while line 1002 is associated with a penetration of 20% and line 1102 is associated with a penetration of 95%. However, the high effective frequency, in combination with the high penetration, results in a relatively low ERR without significant and consistent GRPs being delivered.

Furthermore, a comparison of line 802 of graph 800 with line 1002 of graph 1000 demonstrates the impact of different effective frequencies (e.g., 1 for line 802 and 4 for line 1002) for a fixed penetration (e.g., 20%). In particular, the higher the effective frequency, the more abruptly the ERR rises or falls depending upon the amount of GRPs delivered. For example, although the ERR in graph 800 rises quickly initially (which is characteristic for an effective frequency of 1), the rising and falling of the ERR thereafter is relatively gradual (e.g., from the eighth week 118 to the tenth week 122 the ERR in graph 800 declines by a little more than a third). In contrast, in graph 1000 where the effective frequency is 4, the ERR rises and falls much more abruptly (e.g., from the eighth week 118 to the tenth week 122 the ERR in graph 1000 is nearly entirely dissipated). Again, the same phenomenon is demonstrated by the lines 902, 1102 of graphs 900, 1100 where the penetration is fixed at 95%.

Thus, the diminishing returns effect of saturation as determined from the effective frequency and penetration associated with a particular advertising campaign can significantly affect the variation of the ERR observed over time as well as how abruptly that variation occurs. Further, such knowledge can significantly improve marketing mix models to more accurately represent historical data and, therefore, can more accurately predict the impact of particular marketing schemes on future sales and/or more reliably plan new marketing campaigns. However, none of this information is available with currently known marketing mix systems because the model estimation does not take saturation into account. While a market analyst may try to account for saturation after the fact, any such efforts are limited in that they are not based on, or fit to, actual data.

Figure 12:
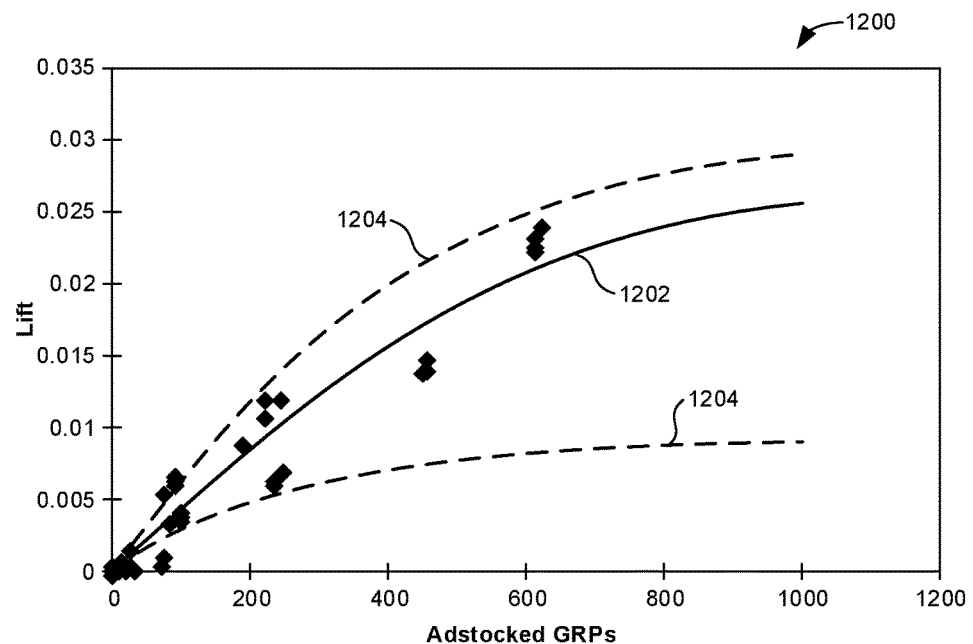
FIG. 12 illustrates an example response curve fit to the data points of FIG. 2 calculated in accordance with the teachings disclosed herein.

FIG. 12 illustrates graph 1200 with the same plotted data points as shown in the graph 200 of FIG. 2. However, unlike the graph 200 of FIG. 2, the graph 1200 of FIG. 12 includes a best fitting response curve 1202 calculated using some of the teachings disclosed herein. As described above in connection with FIG. 2, the data points plotted in the graph 1200 are based outputs of a known marketing mix model (i.e., does not account for saturation during model estimation). As shown in the illustrated example, unlike the response curve 202 (which is a straight line) the best fitting response curve 1202 follows a curve indicative of a diminishing returns effect. While market analysts may adjust the response curve 202 after model estimation to imitate saturation, the response curve 1202 of the illustrated example is determined based on modified saturation curves 1204 that are calculated similar to the saturation curves calculated above (e.g., based on plausible ranges of effective frequencies and penetrations associated with the advertising campaign being analyzed) and then scaled to represent lift rather than reach. More particularly, in some examples, a plausible range of modified saturation curves are calculated and then tested for best fit against the model output data. The two best fitting curves that bound the data (e.g., the modified saturation curves 1204) are identified and set as boundaries for determining the best fit response curve 1202. In this manner, even without incorporating saturation into model estimation, the resulting best fit response curve 1202 is still an improvement over the response curve 202 and does not require guesswork by an analyst to correct it for saturation after the fact.

Figure 13:
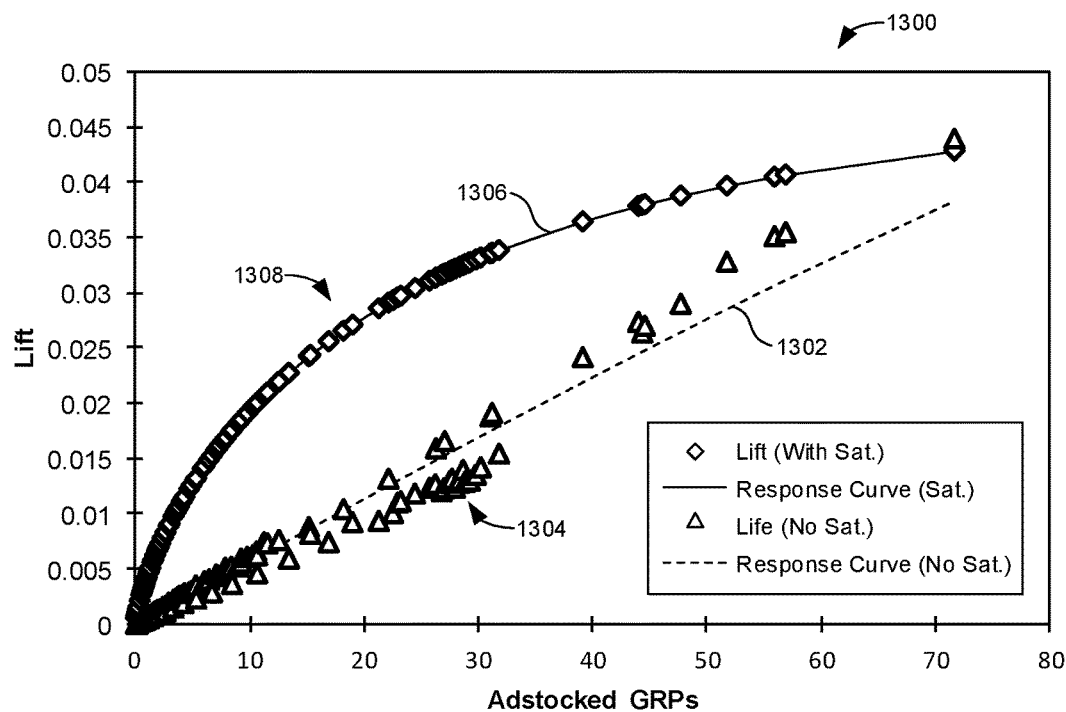
FIG. 13 illustrates a response curve fit to data points associated with lift for a particular advertising campaign output from a known marketing mix model (e.g., without saturation) and an example response curve fit to data points associated with lift for the same advertising campaign output from a marketing mix model generated in accordance with the teachings disclosed herein (e.g., with saturation).

Although the example response curve 1202 described in connection with FIG. 12 provides an improvement over known marketing mix systems, even more reliable response curves can be obtained when saturation is incorporated into model estimation as has been described above. FIG. 13 illustrates an example graph 1300 with a response curve 1302 fit to data points 1304 associated with lift for a particular advertising campaign output from a known marketing mix model (e.g., without saturation). Additionally, the example graph 1300 of FIG. 13 includes another response curve 1306 fit to data points 1308 associated with lift for the same advertising campaign output from a marketing mix model generated in accordance with the teachings disclosed herein (e.g., with saturation). As discussed above in connection with FIG. 2, the response curve 1302 that best fits the data points 1304 is a straight line and, therefore, unreliable for evaluating marketing endeavors going forward. In contrast, the response curve 1306 follows a curve that would be expected based on the diminishing returns effect of increased GRPs. Furthermore, the response curve 1306 closely fits the data points 1308 output by the marketing mix model. Accordingly, the response curve 1306 is not based on the intuition of market analysts trying to correct the straight line of the curve 1302 after the fact, but is based on actual data. As such, the response curve 1306 is far more reliable in evaluating future advertising campaigns to forecast future sales and/or to plan and/or adjust a marketing mix scheme to enhance (e.g., maximize) a return on investment.

Figure 14:
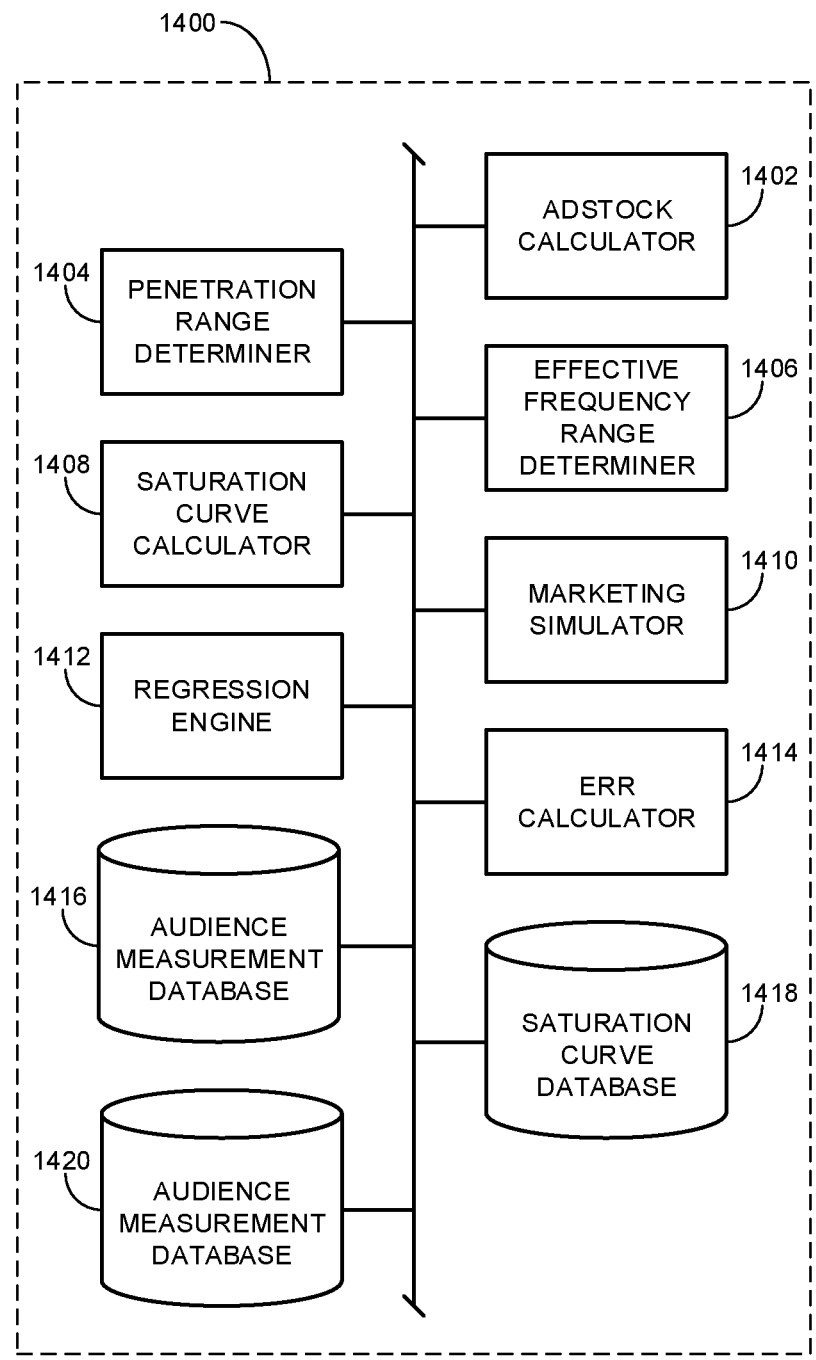
FIG. 14 is a schematic illustration of an example marketing mix model generator constructed in accordance with the teachings disclosed herein.

FIG. 14 is a schematic illustration of an example marketing mix model generator 1400 constructed in accordance with the teachings disclosed herein. In the illustrated example of FIG. 14, the example marketing mix model generator 1400 includes an adstock calculator 1402, a penetration range determiner 1404, an effective frequency range determiner 1406, a saturation curve calculator 1408, a marketing simulator 1410, a regression engine 1412, an ERR calculator 1414, an audience measurement database 1416, a saturation curve database 1418, and a marketing mix inputs database 1420.

In operation, the marketing mix inputs database 1420 stores information used as inputs to be analyzed in generating a marketing mix model. In some examples, inputs for the model estimation include the time-phased expenditure for various media (e.g., television, radio, print, online, etc.) in different geographical locations (e.g., measured in GRPs), the amount of trade or promotional spending (e.g., measured in GRPs), seasonal factors (e.g., weather), sales data for one or more products or services over time, and any other information that may be deemed to be important in determining sales (e.g., macro-economic factors). The example marketing mix model generator 1400 is provided with the adstock calculator 1402 to convert the raw GRPs associated with each advertising campaign into effective GRPs realized over time (i.e., Adstocked GRPs).

The example marketing mix model generator 1400 is provided with the penetration range determiner 1404 and the effective frequency range determiner 1406 to determine a range of plausible penetrations and effective frequencies to define corresponding plausible saturation curves to be tested for best fit to the model data. In some examples, a penetration range is determined based on demographic data and media type information stored in the audience measurement database 1416. In particular, in some such examples, the penetration range determiner 1404 identifies an initial penetration based on the demographics of the target audience for each advertising campaign compared with the stored demographic data associated with the media type corresponding to each advertising campaign. Once the initial penetration estimate is determined, in some examples, a reasonable range of penetration values surrounding the initial penetration are selecting for testing (e.g., 15% above and below the initial penetration estimate). Additionally or alternatively, in some examples, other attributes associated with the advertising campaign are used to infer an initial penetration estimate including the geographic region of the advertising campaign, the penetration of comparable campaigns associated with related and/or competing products, and/or the results of previous marketing mix studies. In other examples, where specific data to infer penetration (e.g., demographic data, other comparable campaigns, etc.) is not available or otherwise unreliable, the penetration range determiner 1404 selects a broad range of penetration values based on the media type of the advertising campaign being analyzed. In some examples, a market analyst may broaden, narrow, or otherwise adjust the identified range of penetrations to be tested based on their confidence of the appropriateness of the initial penetration and/or knowledge of the particular advertising campaign being analyzed. Additionally, the analyst may define a granularity of penetration values to be tested over the identified range (e.g., every 3%, 1%, 0.5% etc.).

The effective frequency range determiner 1406 determines a range of plausible effective frequencies to be tested based on the nature and complexity of the particular advertising campaign and/or other relevant considerations (e.g., the known effective frequency of comparable campaign advertisements for related and/or competing products, etc.). In some examples, the range of effective frequencies is based on an initial effective frequency estimate input by a market analyst. In some examples, the effective frequency range determiner 1406 defines a lower limit for the effective frequency range to be 1 regardless of the nature of the advertising campaign. Further, in some examples, the analyst may broaden, narrow, or otherwise adjust the identified range of effective frequencies and/or the granularity of the effective frequencies to be tested within the range.

The example marketing mix model generator 1400 is provided with the saturation curve calculator 1408 to calculate the curves in the range of plausible saturation curves defined by the identified ranges of penetrations and effective frequencies. In some examples, the saturation curve calculator 1408 retrieves or looks up the saturation curve in the saturation curve database 1418. In such examples, the saturation curve database 1418 stores a predetermined saturation equation defining saturation curves for any expected penetration value in combination with any expected effective frequency. In some examples, where a curve corresponding to a particular penetration and/or effective frequency is not available for look up in the saturation curve database 1418 (or the saturation curve database 1418 is unavailable), the saturation curve calculator 1408 calculates the saturation curve through a simulation via the marketing simulator 1410. In such examples, the marketing simulator 1410 simulates an advertising campaign at the specified penetration value by plotting simulated GRPs against a resulting reach of a series of advertising messages. Based on the plot of the GRPs associated with a reach at the specified effective frequency a curve can be defined that fits the simulated data. In some examples, the curves used to match the simulated data and/or the curves stored in the saturation curve database 1418 are defined by Weibull functions. However, any other equations that fit the data may alternatively be used. In some examples, the saturation curve calculator 1408 calculates (or looks up) a saturation curve for every possible pairing of the effective frequencies identified within the range of plausible effective frequencies and the penetrations identified within the range of plausible penetrations. In this manner, a range of plausible saturation curves are calculated to be tested for a best fit to the model data. In other examples, the range of plausible saturation curves is based on only some of the effective frequencies paired with only some of the penetrations within the corresponding ranges to improve computational efficiency.

The example marketing mix model generator 1400 is provided with the regression engine 1412 to determine the saturation curve among the range of plausible saturation curves that best fits the model data stored in the marketing mix inputs database 1420. In some examples, a regression is run on all the model data with the saturation curves used for each advertising campaign being held constant except for the saturation curve associated with the advertising campaign being analyzed for best fit. That is, while each advertising campaign will have a separate range of saturation curves to be tested for best fit, when determining the best fit curve of a particular advertising campaign each curve in the range of plausible saturation curves corresponding to the particular campaign is run through the regression engine while a default saturation curve is set for each of the other advertising campaigns during all of the saturation curves tested for the particular campaign being analyzed. In some examples, the default saturation curve for each advertising campaign corresponds to the saturation curve defined by the initial estimate of the penetration and effective frequency associated with the corresponding advertising campaign. In other examples, the default saturation curve is set as the curve defined by the midpoint penetration of the range of plausible penetrations and the midpoint effective frequency of the range of plausible effective frequencies for each campaign. In other examples, other methods of setting the default saturation curve may alternatively be implemented. In some examples, the curves within the range of plausible saturation curves are calculated (looked up) by the saturation curve calculator 1408 in conjunction with the regression performed via the regression engine 1412. That is, in such examples, a first saturation curve within the range of plausible saturation curves is calculated and then the regression engine 1412 generates a marketing mix model based on the calculated curve and default saturation curves for all other advertising campaigns. Then, a second saturation curve (e.g., having a different penetration and/or effective frequency than the first saturation curve) within the range of plausible saturation curves is similarly calculated and subsequently run through the regression.

Furthermore, while the regression engine 1412 may run through each curve in the range of plausible saturation curves calculated by the saturation curve calculator 1408, in other examples, the regression engine only runs through some of the curves In the range of plausible saturation curves defined by the identified ranges of penetration and effective frequency. For instance, in some such examples, a default effective frequency (e.g., the midpoint within the range of plausible effective frequencies) is fixed while each penetration in the range of plausible penetrations is evaluated to calculate a series of saturation curves. In such examples, the series of saturation curves (all associated with the same effective frequency) are analyzed by the regression engine 1412 to determine a best fit penetration corresponding to the best fit saturation curve in the series analyzed. In some such examples, the identified best fit penetration is then set as a default penetration and another series of saturation curves are calculated based on varying the effective frequency over the entire range of plausible effective frequencies. In the same manner as above, in some examples, the second series of saturation curves (all associated with the same penetration) are analyzed by the regression engine 1412 to determine a best fit effective frequency. Then, based on the best first penetration and best fit effective frequency the saturation curve calculator 1408 calculates (or looks up) a corresponding saturation curve that is then designated as the best fit saturation curve. In other examples, the best fit effective frequency is determined first and then the best fit penetration is determined.

The example marketing mix model generator 1400 is provided with the ERR calculator 1414 to transform or convert the Adstocked GRPs calculated by the adstock calculator 1402 into ERR for each advertising campaign. The ERR calculator 1414 transforms the Adstocked GRPs via the best fit saturation curve identified by the saturation curve calculator 1408 and regression engine 1420 as described above. Once the Adstocked GRPs for each advertising campaign to be analyzed have been transformed to ERR based on the best fit saturation curve associated with each campaign, the regression engine 1412 then runs the ERR data for each campaign through a full regression to generate a final marketing mix model estimation that can then be evaluated to forecast future sales and/or make plans for future marketing endeavors that enhance (e.g., optimize) the use of budgeted marketing funds as is known in the art.

While an example manner of implementing the example marketing mix model generator 1400 of FIG. 14 is illustrated in FIG. 14, one or more of the elements, processes and/or devices illustrated in FIG. 14 may be combined, divided, re-arranged, omitted, eliminated and/or implemented in any other way. Further, the example adstock calculator 1402, the example penetration range determiner 1404, the example effective frequency range determiner 1406, the example saturation curve calculator 1408, the example marketing simulator 1410, the example regression engine 1412, the example ERR calculator 1414, the example audience measurement database 1416, the example saturation curve database 1418, the example marketing mix inputs database 1420 and/or, more generally, the example marketing mix model generator 1400 of FIG. 14 may be implemented by hardware, software, firmware and/or any combination of hardware, software and/or firmware. Thus, for example, any of the example adstock calculator 1402, the example penetration range determiner 1404, the example effective frequency range determiner 1406, the example saturation curve calculator 1408, the example marketing simulator 1410, the example regression engine 1412, the example ERR calculator 1414, the example audience measurement database 1416, the example saturation curve database 1418, the example marketing mix inputs database 1420 and/or, more generally, the example marketing mix model generator 1400 could be implemented by one or more circuit(s), programmable processor(s), application specific integrated circuit(s) (ASIC(s)), programmable logic device(s) (PLD(s)) and/or field programmable logic device(s) (FPLD(s)), etc. When reading any of the apparatus or system claims of this patent to cover a purely software and/or firmware implementation, at least one of the example adstock calculator 1402, the example penetration range determiner 1404, the example effective frequency range determiner 1406, the example saturation curve calculator 1408, the example marketing simulator 1410, the example regression engine 1412, the example ERR calculator 1414, the example audience measurement database 1416, the example saturation curve database 1418, and/or the example marketing mix inputs database 1420 are hereby expressly defined to include a tangible computer readable storage device or storage disc such as a memory, DVD, CD, Blu-ray, etc. storing the software and/or firmware. Further still, the example marketing mix model generator 1400 of FIG. 14 may include one or more elements, processes and/or devices in addition to, or instead of, those illustrated in FIG. 14, and/or may include more than one of any or all of the illustrated elements, processes and devices.

Figure 15:
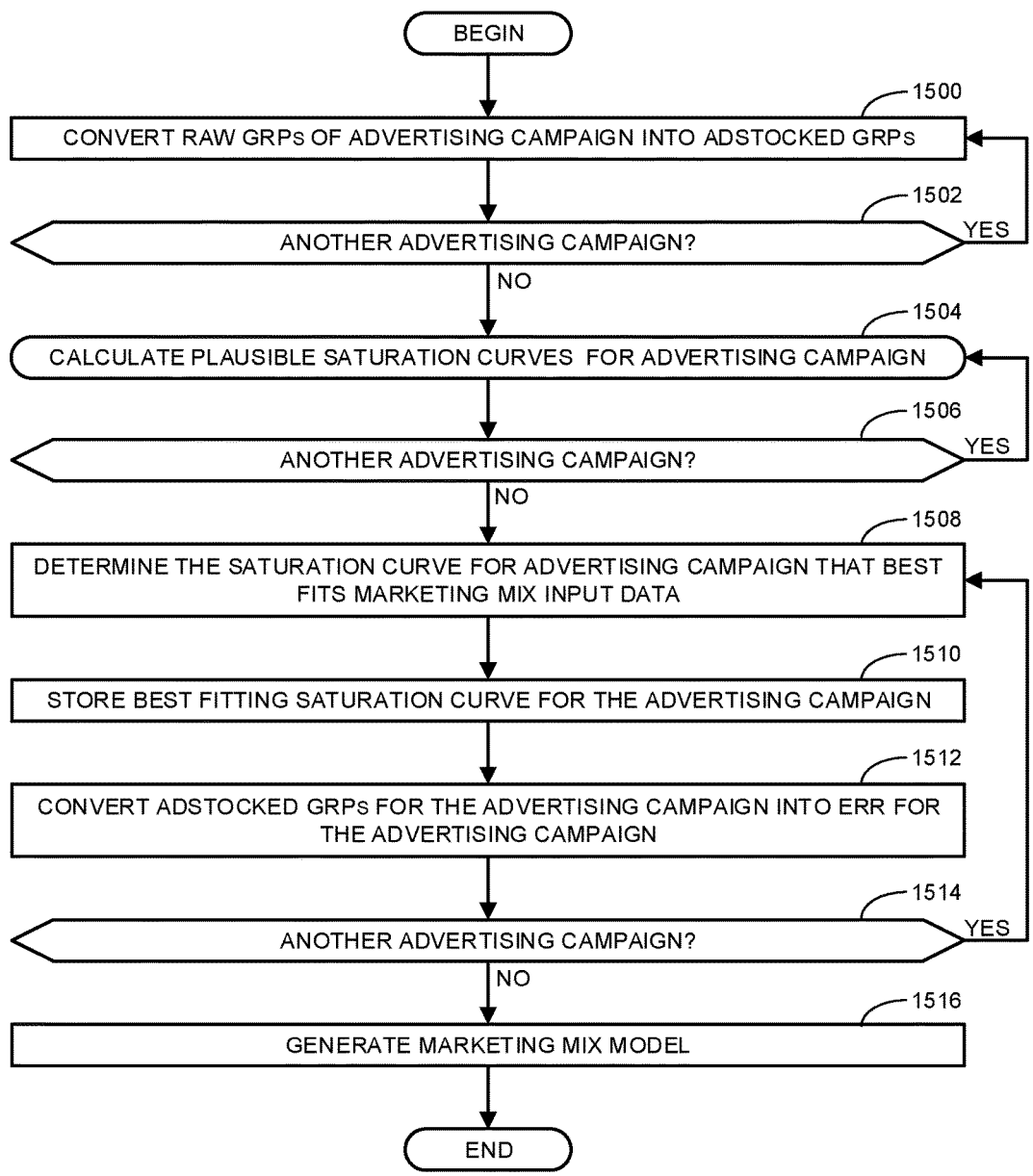
FIG. 15 is a flowcharts representative of example machine readable instructions for implementing the example marketing mix model generator of FIG. 14 to generate a marketing mix model.
Figure 16:
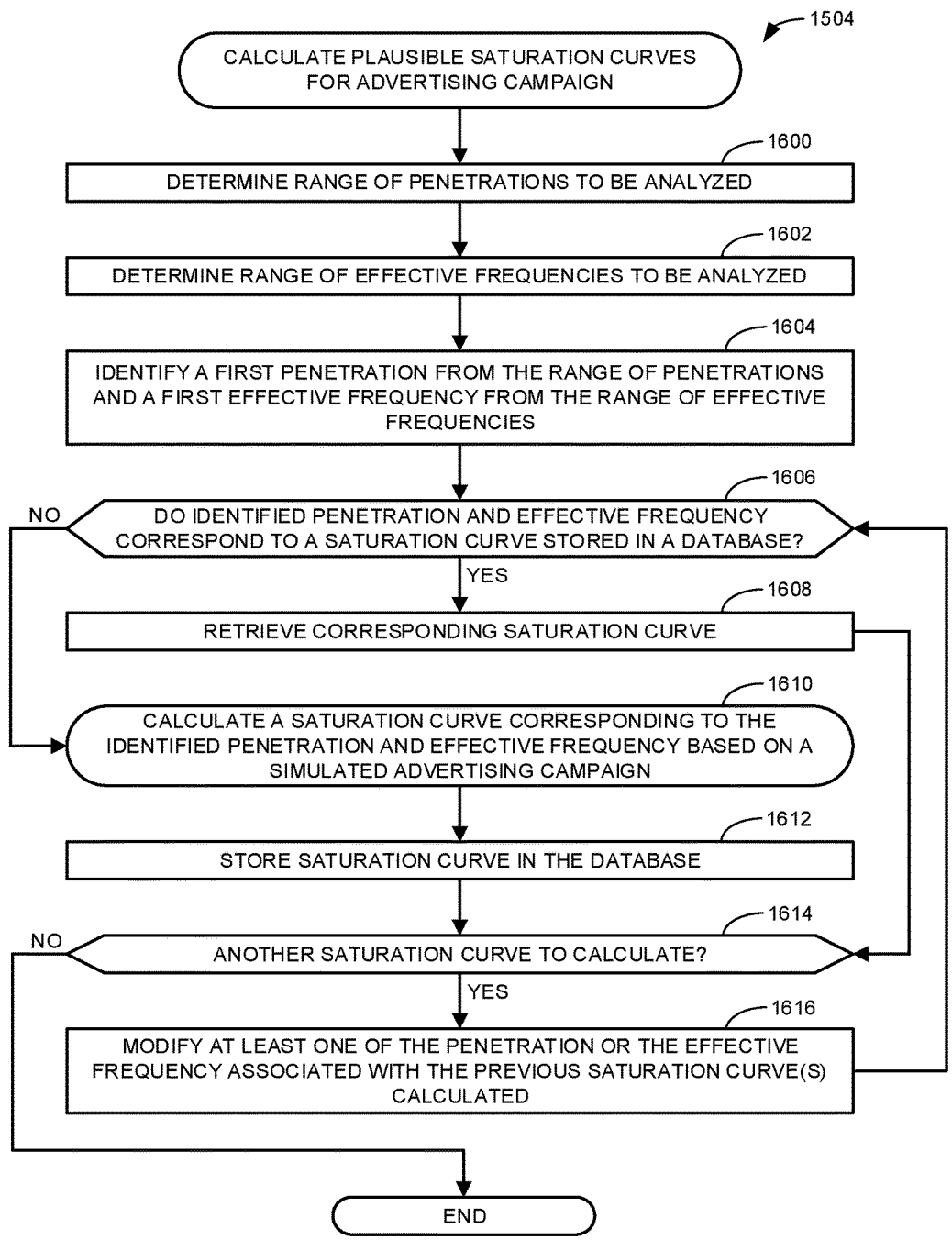
FIG. 16 is a flowcharts representative of example machine readable instructions for implementing the example marketing mix model generator of FIG. 14 to calculate plausible saturation curves to generate the marketing mix model as in FIG. 15.
Figure 17:
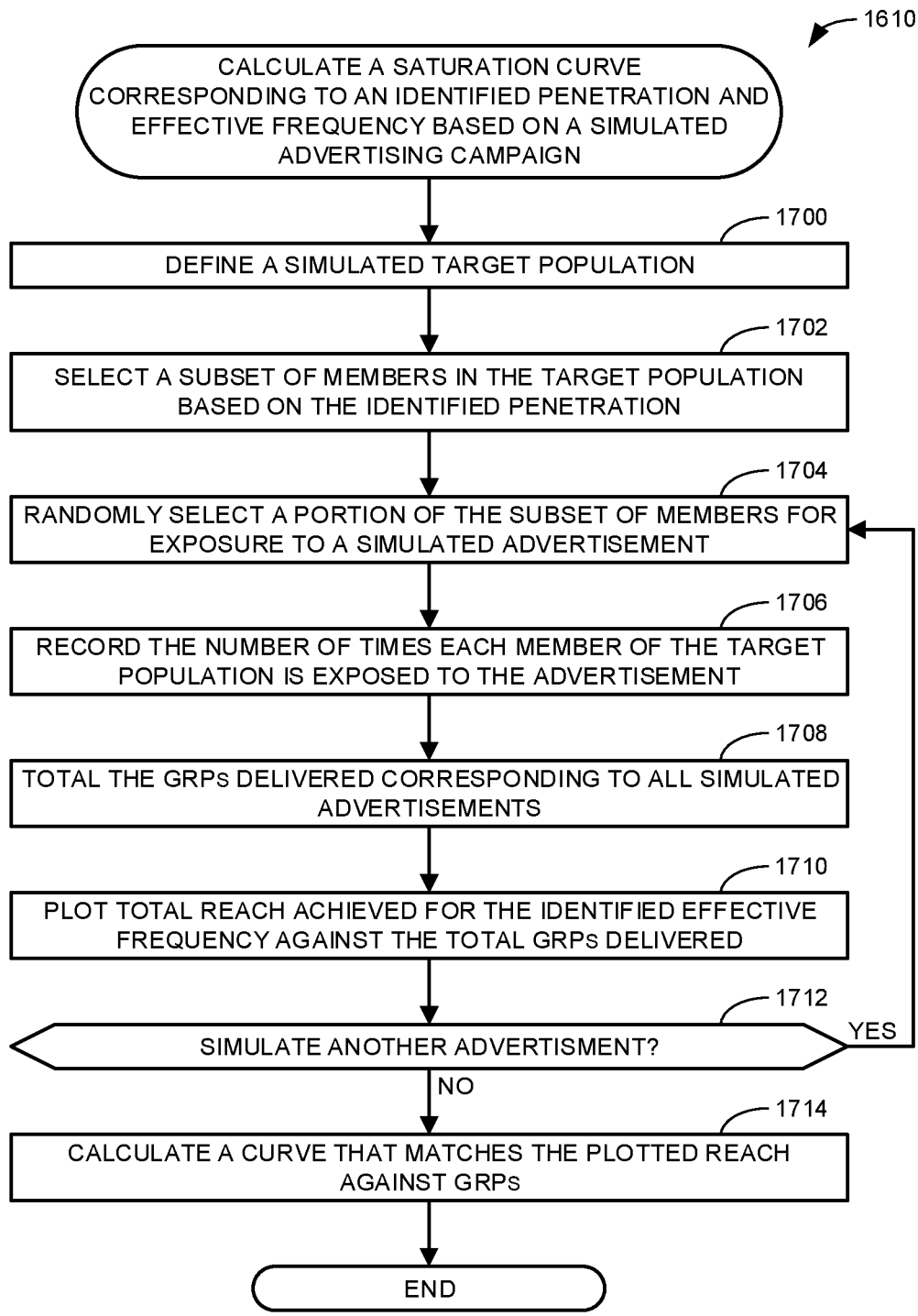
FIG. 17 is a flowcharts representative of example machine readable instructions for implementing the example marketing mix model generator of FIG. 14 to simulate an advertising campaign to calculate plausible saturation curves as in FIG. 16.

Flowcharts representative of example machine readable instructions for implementing the example marketing mix model generator 1400 of FIG. 14 are shown in FIGS. 15-17. In these examples, the machine readable instructions comprise a program for execution by a processor such as the processor 1812 shown in the example processor platform 1800 discussed below in connection with FIG. 18. The program may be embodied in software stored on a tangible computer readable storage medium such as a CD-ROM, a floppy disk, a hard drive, a digital versatile disk (DVD), a Blu-ray disk, or a memory associated with the processor 1812, but the entire program and/or parts thereof could alternatively be executed by a device other than the processor 1812 and/or embodied in firmware or dedicated hardware. Further, although the example program is described with reference to the flowcharts illustrated in FIGS. 15-17, many other methods of implementing the example marketing mix model generator 1400 may alternatively be used. For example, the order of execution of the blocks may be changed, and/or some of the blocks described may be changed, eliminated, or combined.

As mentioned above, the example processes of FIGS. 15-17 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 15-17 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disc and to exclude propagating signals. As used herein, when the phrase "at least" is used as the transition term in a preamble of a claim, it is open-ended in the same manner as the term "comprising" is open ended.

The example program of FIG. 15 begins at block 1500 where the example adstock calculator 1402 converts raw GRPs of an advertising campaign into Adstocked GRPs. In some examples, the example adstock calculator 1402 converts raw GRPs via Equation 1. Such a transformation of raw GRPs is known in the art and not further described here. At block 1500, the example adstock calculator 1402 determines whether there is another advertising campaign with raw GRPs to be converted to Adstocked GRPs. If the example adstock calculator 1402 determines that there is another advertising campaign to be analyzed, control returns to block 1500.

If the example adstock calculator 1402 determines there are no additional advertising campaigns to be analyzed to calculate Adstocked GRPs (block 1502), control advances to block 1504 where the example saturation curve calculator 1408 calculates plausible saturation curves for an advertising campaign. As described above, in some examples, the example saturation curve calculator 1408 calculates a range of plausible saturation curves based on ranges of plausible effective frequencies and penetrations determined via the example penetration range determiner 1404 and example effective frequency determiner 1406. In some examples, the example saturation curve calculator 1408 retrieves the plausible saturation curves from the saturation curve database 1418 by looking them up based on the ranges of plausible effective frequencies and penetrations. In other examples, where saturation curves are not available for look up, the example saturation curve calculator 1408 invokes the example marketing simulator 1410 to generate simulated data points of GRPs that can be plotted against reach to determine a corresponding saturation curve. Additional details associated with calculating plausible saturation curves and simulating an advertising campaign are described below in connection with the example processes of FIGS. 16 and 17. At block 1506, the example saturation curve calculator 1408 determines whether there is another advertising campaign for which plausible saturation curves are to be calculated. If the example saturation curve calculator 1408 determines that there is another advertising campaign for which plausible saturation curves are to be calculated, control returns to block 1504.

If the example saturation curve calculator 1408 determines there are no additional advertising campaigns for which plausible saturation curves are to be calculated (block 1506), control advances to block 1508 where the example regression engine 1412 determines the saturation curve for the advertising campaign that best fits the marketing mix input data. As described above, in some examples, the example regression engine 1412 runs some or all of the saturation curves calculated by the example saturation curve calculator 1408 (block 1504) through a regression to identify the saturation curve among the plausible saturation curves that best fits the marketing mix input data stored in the example marketing mix inputs database 1420.

At block 1510, the example saturation curve database 1418 stores the best fitting saturation curve for the advertising campaign. In this manner, when a similar advertising campaign is to be analyzed, in the same or a different marketing mix model, the stored saturation curve can be retrieved as an initial estimate of the saturation curve for the similar advertising campaign to provide more refined results and/or a narrow range of plausible saturation curves to increase computational efficiency.

At block 1512, the example ERR calculator 1414 converts the Adstocked GRPs for an advertising campaign into ERR for the campaign. In some examples, the example ERR calculator 1414 transforms the Adstocked GRPs into ERR based on a saturation equation that defines the best fitting saturation curve determined by the example regression engine 1412 (block 1508). In some examples, the saturation equation corresponds to a Weibull function. At block 1514, the example regression engine 1412 determines whether there is another advertising campaign for which a best fitting saturation curve is to be determined. If the example regression engine 1412 determines there is another such advertising campaign, controls returns to block 1508.

If the example regression engine 1412 determines there are no other advertising campaign for which a best fitting saturation curve is to be determined, control advances to block 1516 where the example regression engine 1412 generates a marketing mix model. In some examples, the generated marketing mix model is based on a regression analysis of the best fitting saturation curve for each advertising campaign relative to the information stored in the example marketing mix inputs database 1420. In this manner, the contribution of each advertising campaign impacting sales may be determined while accounting for the diminishing returns effect of saturation and subsequently evaluated using methods known in the art. Accordingly, once the example regression engine 1412 has generated the marketing mix model, the example process of FIG. 15 ends.

FIG. 16 illustrates an example process with additional detail for implementing block 1504 of the example process of FIG. 15 to calculate plausible saturation curves for an advertising campaign. The example process of FIG. 16 begins at block 1600 where the example penetration range determiner 1404 determines a range of penetrations to be analyzed. In some examples, the example penetration range determiner 1404 determines the range of penetrations by identifying an initial penetration estimate. In some examples, the initial penetration estimate is based on the media type and/or demographic information stored in the audience measurement database. In other examples, the initial penetration is based on the penetration associated with a saturation curve stored in the example saturation curve database 1418 that corresponds to an advertising campaign similar to the advertising campaign being analyzed. Additionally or alternatively, the example penetration range determiner 1404 may consider other factors to determine the range of penetrations associated with the advertising campaign (e.g., geographic region, penetrations for related or competing products, etc.) With the initial penetration estimate identified, the example penetration range determiner 1404 determines a range of plausible penetrations surrounding the initial penetration estimate for analysis.

At block 1602, the example effective frequency range determiner 1404 determines a range of effective frequencies to be analyzed. In some examples, the example effective frequency range determiner 1404 determines the range of effective frequencies by identifying a range of effective frequencies surrounding an initial effective frequency input by a marketing analyst (e.g., based on a complexity of the advertisement). In some examples, the initial effective frequency is based on the effective frequency associated with a saturation curve stored in the example saturation curve database 1418 that corresponds to an advertising campaign similar to the advertising campaign being analyzed.

At block 1604, the example saturation curve calculator 1408 identifies a first penetration from the range of penetrations and a first effective frequency from the range of effective frequencies. In some examples, the first penetration and first effective frequency correspond to the initial penetration and initial effective frequency. In other examples, the first penetration and first effective frequency correspond to a penetration and effective frequency at a lower or upper end of the corresponding range of penetrations and range of effective frequencies. In some examples, the first penetration and first effective frequency correspond to midpoints within the corresponding range of penetrations and range of effective frequencies.

At block 1606, the example saturation curve calculator 1408 determines whether the identified penetration and effective frequency correspond to a saturation curve stored in the saturation curve database 1418. If a corresponding saturation curve is stored in the saturation curve database 1418, the example saturation curve calculator 1408 retrieves the corresponding saturation curve at block 1608. After the saturation curve is retrieved, control advances to block 1614 where the example saturation curve calculator 1408 determines whether to calculate another saturation curve as will be described more fully below. If the example saturation curve calculator 1408 determines that the identified penetration and effective frequency do not correspond to a saturation curve stored in the saturation curve database 1418, control advances to block 1610.

At block 1610, the example saturation curve calculator 1408 calculates a saturation curve corresponding to the identified penetration and effective frequency based on a simulated advertising campaign. Additional details associated with simulating an advertising campaign are described below in connection with the example process of FIG. 17. At block 1612, the example saturation curve calculator 1408 stores the calculated saturation curve in the saturation curve database 1418. In this manner, if the same penetration and effective frequency are identified while analyzing another advertising campaign, the corresponding saturation curve can be retrieved from the database (block 1608) rather than simulating another advertising campaign (block 1610).

At block 1614 the example saturation curve calculator 1408 determines whether another saturation curve is to be calculated. In some examples, the saturation curve calculator 1408 will calculate saturation curves for all pairings of penetrations and effective frequencies in the corresponding range of penetrations and range of effective frequencies. In other examples, only some of the penetrations and/or effective frequencies will be used to calculate saturation curves. For instance, in some examples, a single default effective frequency will be used while the example saturation curve calculator 1408 calculates a saturation curve corresponding to each penetration within the range of penetrations. In some such examples, the resulting saturation curves will be analyzed via the example regression engine 1412 (similar to block 1508 of FIG. 15) to determine a best fit penetration before a default penetration (e.g., the best fit penetration) is used while the example saturation curve calculator 1408 calculates a saturation curve corresponding to each effective frequency within the range of effective frequencies. Accordingly, if the example saturated curve calculator 1408 determines another saturation curve is to be calculated (block 1608), control advances to block 1616 where the example saturation curve calculator 1408 modifies at least one of the penetration or effective frequency associated with the previous saturation curve(s) calculated. For example, as described above, the effective frequency (or the penetration) may be held constant while different penetrations (or effective frequencies) are used to calculate different saturation curves. However, other methods of modifying the effective frequency and penetration to be used in calculating the saturation curves may alternatively be implemented.

Once at least one of the penetration or the effective frequency associated with previous saturation curve(s) have been modified (block 1616), control returns to block 1606 where the corresponding curve may be either retrieved (block 1608) or calculated based on a simulated advertising campaign (block 1610) as described above. Returning to block 1614, if the example saturated curve calculator 1408 determines that no other saturation curves are to be calculated, the example process of FIG. 16 ends.

FIG. 17 illustrates an example process with additional detail for implementing block 1604 and/or block 1610 of the example process of FIG. 16 to calculate plausible saturation curves for an advertising campaign by simulating an advertising campaign. The example process of FIG. 17 begins at block 1700 where the example marketing simulator 1410 defines a simulated target population (e.g., 10,000 individuals (or households)). At block 1702 the example marketing simulator 1410 selects a subset of members in the target population based on the identified penetration. For example, if the penetration determined by the example penetration range determiner 1404 is 60%, the example marketing simulator 1410 would select 60% of the target population as representative of individuals (or households) capable of being reached by the advertising campaign (e.g., 6,000 of the 10,000 total population).

At block 1704, the example marketing simulator 1410 randomly selects a portion of the subset of members for exposure to a simulated advertisement. The portion of members selected by the example marketing simulator 1410 is based on the simulated GRPs associated with the simulated advertisement. For example, if the simulated advertisement is associated with 5 GRPs, the corresponding reach of the advertisement would be 5% of the target population (e.g., 500 members randomly selected from the 6,000 members identified based on the penetration). At block 1706, the example marketing simulator 1410 records the number of times each member of the target population is exposed to the advertisement. After the first advertisement, the number of time the 500 members are exposed to the advertisement would be one, while the number of times all other members in the population are exposed to the advertisement would zero. However, as is described more fully below in connection with block 1712, the example process of FIG. 17 may iterate through multiple simulated advertisements. In such examples, some of the initial 500 members may be randomly selected for exposure to the simulated advertisement a second time, while the advertisement would be the first exposure for other randomly selected members. Accordingly, the example marketing simulator 1410 records the number of times each member of the target population is exposed to the advertisement, which may vary from member to member as more advertisements are simulated.

At block 1708 the example marketing simulator 1410 totals the GRPs delivered corresponding to all simulated advertisements. That is, after the first simulated advertisement, the total GRPs corresponds to the GRPs associated with the first advertisement. However, after multiple simulated advertisements, the total GRPs corresponds to the sum of the GRPs associated with each of the simulated advertisements. At block 1710 the example marketing simulator 1410 plots the total reach achieved at the identified effective frequency against the total GRPs delivered. The identified effective frequency is based on the effective frequency identified by the effective frequency range determiner 1406 and the total reach achieved corresponds to the number of members having been exposed to the simulated advertisements at least the same amount as the effective frequency. For example, if the effective frequency is 2, the reach would correspond to the number of members that were exposed to the simulated advertisements at least 2 times. In some examples, the example marketing simulator 1410 calculates the reach as a percentage by dividing the total number reached by the total size of the target population.

At block 1712, the example marketing simulator 1410 determines whether to simulate another advertisement. In some examples, the example marketing simulator 1410, advertisements continue to be simulated until the total reach plotted levels off near the penetration. That is, the example marketing simulator 1410 continue simulating advertisements until all or nearly all of the subset of members have been exposed to the advertisement at least as many times as the effective frequency. If the example marketing simulator 1410 determines to simulate another advertisement, control returns to block 1704. If the example marketing simulator 1410 determines to not to simulate another advertisement, control advances to block 1714 where the example saturation curve calculator 1408 calculates a curve that matches the plotted reach against GRPs. The resulting curve corresponds to the saturation curve defined by the penetration and effective frequency used in the example process of FIG. 16. Thus, once the example saturation curve calculator 1408 calculates a curve that matches the plotted reach against GRPs, the example process of FIG. 17 ends.

Figure 18:
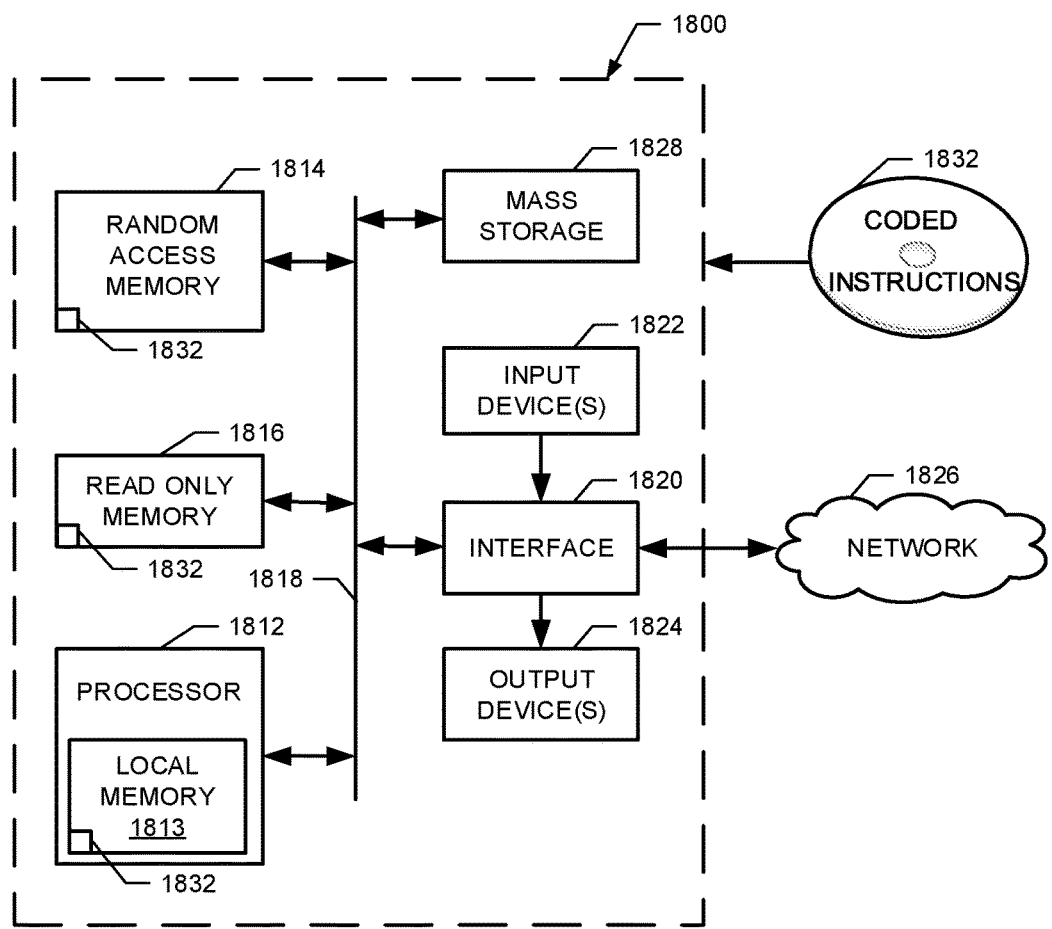
FIG. 18 is a schematic diagram of an example processor platform capable of executing the instructions of FIGS. 15-17 to implement the example marketing mix model generator of FIG. 14.

FIG. 18 is a block diagram of an example processor platform 1800 capable of executing the instructions of FIGS. 15-17 to implement the example marketing mix model generator 1400 of FIG. 14. The processor platform 1800 can be, for example, a server, a personal computer, a mobile device (e.g., a cell phone, a smart phone, a tablet such as an iPad™), a personal digital assistant (PDA), an Internet appliance, or any other type of computing device.

The processor platform 1800 of the illustrated example includes a processor 1812. The processor 1812 of the illustrated example is hardware. For example, the processor 1812 can be implemented by one or more integrated circuits, logic circuits, microprocessors or controllers from any desired family or manufacturer.

The processor 1812 of the illustrated example includes a local memory 1813 (e.g., a cache). The processor 1812 of the illustrated example is in communication with a main memory including a volatile memory 1814 and a non-volatile memory 1816 via a bus 1818. The volatile memory 1814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1816 may be implemented by flash memory and/or any other desired type of memory device. Access to the main memory 1814, 1816 is controlled by a memory controller.

The processor platform 1800 of the illustrated example also includes an interface circuit 1820. The interface circuit 1820 may be implemented by any type of interface standard, such as an Ethernet interface, a universal serial bus (USB), and/or a PCI express interface.

In the illustrated example, one or more input devices 1822 are connected to the interface circuit 1820. The input device(s) 1822 permit a user to enter data and commands into the processor 1812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1824 are also connected to the interface circuit 1820 of the illustrated example. The output devices 1824 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1820 of the illustrated example, thus, typically includes a graphics driver card.

The interface circuit 1820 of the illustrated example also includes a communication device such as a transmitter, a receiver, a transceiver, a modem and/or network interface card to facilitate exchange of data with external machines (e.g., computing devices of any kind) via a network 1826 (e.g., an Ethernet connection, a digital subscriber line (DSL), a telephone line, coaxial cable, a cellular telephone system, etc.).

The processor platform 1800 of the illustrated example also includes one or more mass storage devices 1828 for storing software and/or data. Examples of such mass storage devices 1828 include floppy disk drives, hard drive disks, compact disk drives, Blu-ray disk drives, RAID systems, and digital versatile disk (DVD) drives.

Figure 10:
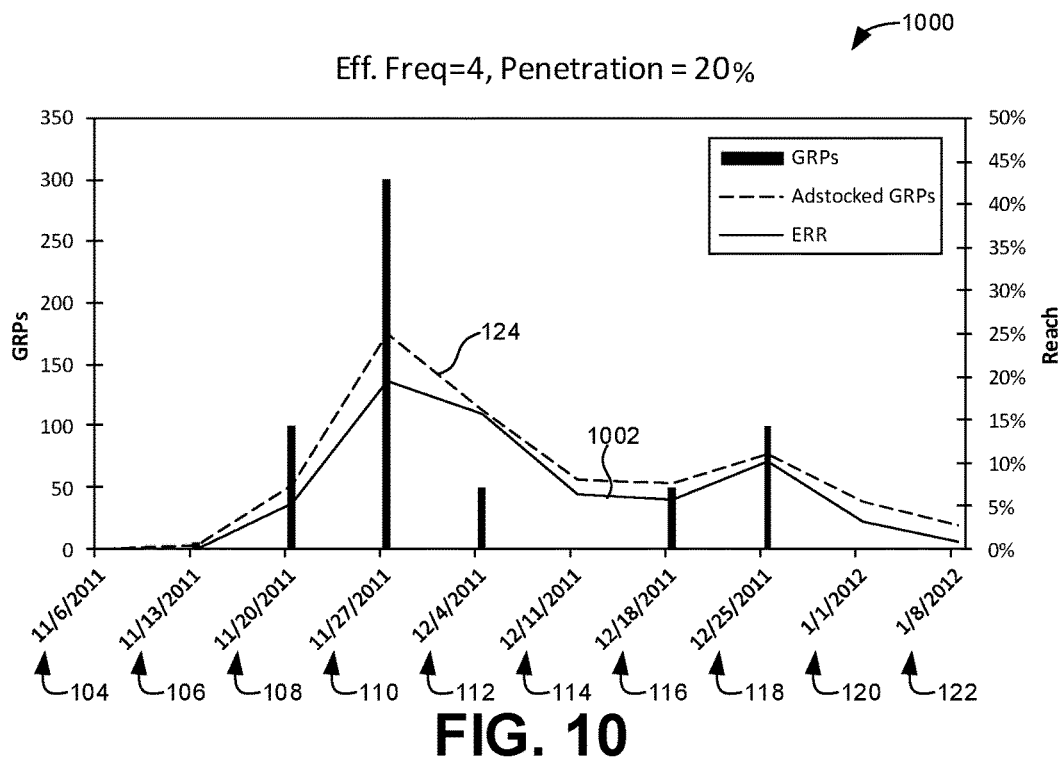
Figure 11:
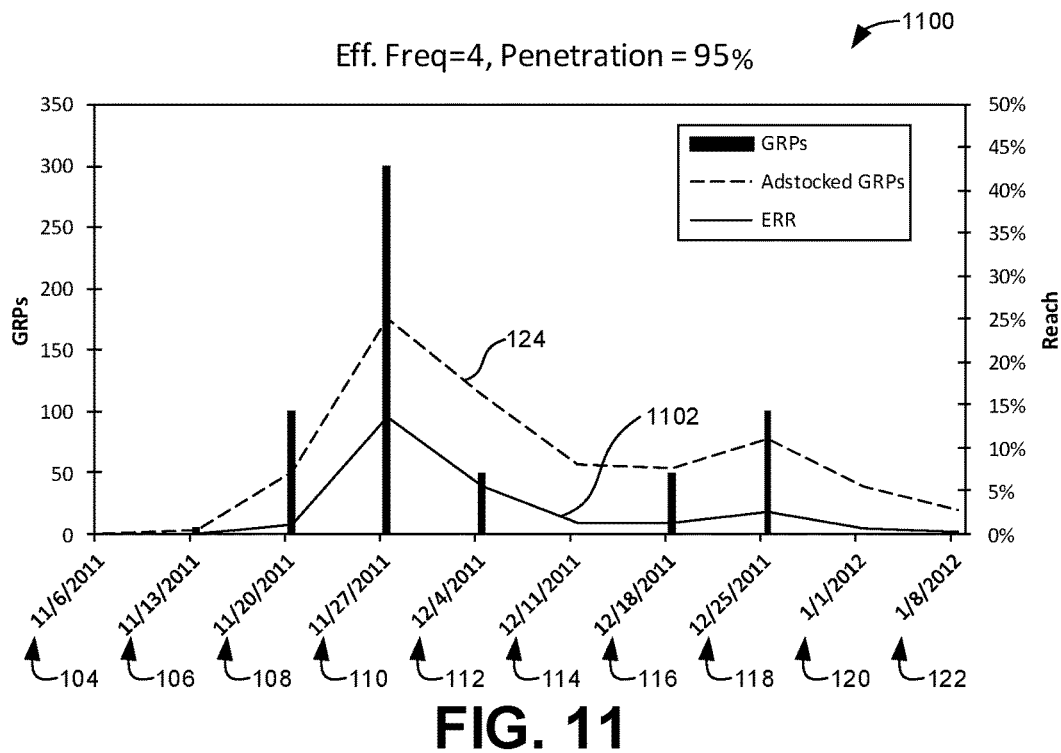

The coded instructions 1832 of FIGS. 15-10 may be stored in the mass storage device 1828, in the volatile memory 1814, in the non-volatile memory 1816, and/or on a removable tangible computer readable storage medium such as a CD or DVD.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. An apparatus to reduce a computational burden on a processor used to generate a marketing mix model, the apparatus comprising:

a regression engine to identify a first saturation curve from among a plurality of plausible curves based on a fit of different ones of the plurality of plausible curves to marketing mix input data, the first saturation curve to define a relationship between reach and adstocked gross rating points indicative of saturation effects of an advertising campaign on a target audience of the advertising campaign; and a reach calculator to convert adstock data associated with the advertising campaign into effective reached realized (ERR) data based on the first saturation curve, the adstock data corresponding to adstocked gross rating points generated from the marketing mix input data, the marketing mix input data including (a) sales data associated with sales over a period of interest and (b) advertising data associated with the advertising campaign during the period of interest; and the regression engine to determine an impact of the advertising campaign on the sales during the period of interest based on a regression analysis of the ERR data relative to the sales data used to generate the marketing mix model, the computational burden on the processor reduced by eliminating tuning of response curves for the marketing mix model after the regression analysis, the eliminating of the tuning of the response curves due to incorporation of the saturation effects of the advertising campaign into the regression analysis, the incorporation of the saturation effects based on the converting of the adstock data into the ERR data using the first saturation curve, at least one of the reach calculator or the regression engine implemented by the processor.

2. The apparatus as defined in claim 1, wherein the ERR data is indicative of a percentage of target audience members that experienced effective exposure to an advertisement of the advertising campaign during a first segment of time in the period of interest an average number of instances sufficient to elicit a response to the advertisement, the effective exposure including actual exposure to the advertisement during the first segment of time and a time lagged effect of actual exposure to the advertisement during previous segments of time prior to the first segment of time.

3. The apparatus as defined in claim 1, further including a database to store the plurality of plausible curves, the relationship determined by looking up ones of the plurality of plausible curves in the database.

4. The apparatus as defined in claim 1, further including a saturation curve calculator to calculate the plurality of plausible curves based on a range of plausible penetrations and a range of plausible effective frequencies, ones of the plausible curves corresponding to (a) ones of the plausible penetrations and (b) ones of the plausible effective frequencies.

5. The apparatus as defined in claim 4, wherein the range of plausible penetrations and the range of plausible effective frequencies are to be determined based on an initial estimate of (a) an initial penetration and (b) an initial effective frequency.

6. The apparatus as defined in claim 5, wherein the initial estimate is to be based on audience measurement data including (a) demographic information corresponding to the target audience of the advertising campaign and (b) media type information corresponding to a type of media associated with the advertising campaign.

7. The apparatus as defined in claim 5, wherein the initial estimate is to be based on at least one of a geographic region associated with the advertising campaign, a type of product or service associated with the advertising campaign, a comparable penetration associated with a comparable campaign for related or competing products, a comparable effective frequency associated with the comparable campaign, or a complexity of the advertising campaign.

8. The apparatus as defined in claim 5, wherein the initial estimate is to be based on a prior saturation curve corresponding to a previously analyzed advertising campaign.

9. The apparatus as defined in claim 5, further including a marketing simulator to:
generate a simulated advertising campaign based on ones of the plausible penetrations and ones of the effective frequencies; and
determine data points indicative of simulated reach corresponding to simulated gross rating points associated with the simulated advertising campaign, wherein the saturation curve calculator is to calculate corresponding ones of the plurality of plausible curves that fits the data points.

10. A non-transitory computer readable medium comprising instructions to reduce a computational burden on a machine used to generate a marketing mix model, the instructions, when executed, cause the machine to at least:
identify a first saturation curve from among a plurality of plausible curves based on a fit of different ones of the plurality of plausible curves to marketing mix input data, the first saturation curve to define a relationship between reach and adstocked gross rating points indicative of saturation effects of an advertising campaign on a target audience of the advertising campaign;
convert adstock data associated with the advertising campaign into effective reached realized (ERR) data based on the first saturation curve, the adstock data corresponding to adstocked gross rating points generated from the marketing mix input data, the marketing mix input data including (a) sales data associated with sales over a period of interest and (b) advertising data associated with the advertising campaign during the period of interest; and
determine an impact of the advertising campaign on the sales during the period of interest based on a regression analysis of the ERR data relative to the sales data used to generate the marketing mix model, the computational burden on the machine reduced by eliminating tuning of response curves for the marketing mix model after the regression analysis, the eliminating of the tuning of the response curves due to incorporation of the saturation effects of the advertising campaign into the regression analysis, the incorporation of the saturation effects based on the converting of the adstock data into the ERR data using the first saturation curve.

11. The non-transitory computer readable medium as defined in claim 10, wherein the ERR data is indicative of a percentage of target audience members that experienced effective exposure to an advertisement of the advertising campaign during a first segment of time in the period of interest an average number of instances sufficient to elicit a response to the advertisement, the effective exposure including actual exposure to the advertisement during the first segment of time and a time lagged effect of actual exposure to the advertisement during previous segments of time prior to the first segment of time.

12. The non-transitory computer readable medium as defined in claim 10, wherein the instructions further cause the machine to calculate the plurality of plausible curves based on a range of plausible penetrations and a range of plausible effective frequencies, ones of the plausible curves corresponding to (a) ones of the plausible penetrations and (b) ones of the plausible effective frequencies.

13. The non-transitory computer readable medium as defined in claim 12, wherein the range of plausible penetrations and the range of plausible effective frequencies are to be determined based on (a) an initial estimate of an initial penetration and (b) an initial effective frequency.

14. The non-transitory computer readable medium as defined in claim 13, wherein the initial estimate is to be based on audience measurement data including (a) demographic information corresponding to the target audience of the advertising campaign and (b) media type information corresponding to a type of media associated with the advertising campaign.

15. A method to reduce a computational burden on at least one processor used to generate a marketing mix model, the method comprising:
identifying, by the at least one processor, a first saturation curve from among a plurality of plausible curves based on a fit of different ones of the plurality of plausible curves to marketing mix input data, the first saturation curve to define a relationship between reach and adstocked gross rating points indicative of saturation effects of an advertising campaign on a target audience of the advertising campaign;
converting, by the at least one processor, adstock data associated with the advertising campaign into effective reached realized (ERR) data based on the first saturation curve, the adstock data corresponding to adstocked gross rating points generated from the marketing mix input data, the marketing mix input data including (a) sales data associated with sales over a period of interest and (b) advertising data associated with the advertising campaign during the period of interest; and determining, by the at least one processor, an impact of the advertising campaign on the sales during the period of interest based on a regression analysis of the ERR data relative to the sales data used to generate the marketing mix model, the computational burden on the at least one processor reduced by eliminating tuning of response curves for the marketing mix model after the regression analysis, the eliminating of the tuning of the response curves due to incorporation of the saturation effects of the advertising campaign into the regression analysis, the incorporation of the saturation effects based on the converting of the adstock data into the ERR data using the first saturation curve.

16. The method as defined in claim 15, wherein the ERR data is indicative of a percentage of target audience members that experienced effective exposure to an advertisement of the advertising campaign during a first segment of time in the period of interest an average number of instances sufficient to elicit a response to the advertisement, the effective exposure including actual exposure to the advertisement during the first segment of time and a time lagged effect of actual exposure to the advertisement during previous segments of time prior to the first segment of time.

17. The method as defined in claim 15, further including calculating the plurality of plausible curves based on a range of plausible penetrations and a range of plausible effective frequencies, ones of the plausible curves corresponding to (a) ones of the plausible penetrations and (b) ones of the plausible effective frequencies.

18. The non-transitory computer readable medium as defined in claim 10, wherein the instructions further cause the machine to store the plurality of plausible curves in a database, the relationship determined by looking up ones of the plurality of plausible curves in the database.

19. The non-transitory computer readable medium as defined in claim 13, wherein the initial estimate is to be based on at least one of a geographic region associated with the advertising campaign, a type of product or service associated with the advertising campaign, a comparable penetration associated with a comparable campaign for related or competing products, a comparable effective frequency associated with the comparable campaign, or a complexity of the advertising campaign.

20. The non-transitory computer readable medium as defined in claim 13, wherein the initial estimate is to be based on a prior saturation curve corresponding to a previously analyzed advertising campaign.

* * * * *